US012733065B2

(12) United States Patent
Manolakos et al.

(10) Patent No.: US 12,733,065 B2
(45) Date of Patent: Sep. 8, 2026

(54) SOFT COLLISION BETWEEN PRS AND OTHER CHANNELS IN RRC INACTIVE AND IDLE MODES

(71) Applicant: QUALCOMM Incorporated, San Diego, CA (US)

(72) Inventors: Alexandros Manolakos, Escondido, CA (US); Sony Akkarakaran, Poway, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 18/568,776

(22) PCT Filed: Jul. 25, 2022

(86) PCT No.: PCT/US2022/038218
§ 371 (c)(1),
(2) Date: Dec. 8, 2023

(87) PCT Pub. No.: WO2023/022853
PCT Pub. Date: Feb. 23, 2023

(65) Prior Publication Data

US 2025/0081279 A1 Mar. 6, 2025

(30) Foreign Application Priority Data

Aug. 20, 2021 (GR) .............................. 20210100564

(51) Int. Cl.
*H04W 76/27* (2018.01)
*H04L 5/00* (2006.01)
(Continued)

(52) U.S. Cl.
CPC ........... *H04W 76/27* (2018.02); *H04L 5/0048* (2013.01); *H04W 24/08* (2013.01); *H04W 64/00* (2013.01);
(Continued)

(58) Field of Classification Search
CPC ..... H04W 76/27; H04W 24/08; H04W 64/00; H04W 72/232; H04W 72/569;
(Continued)

(56) References Cited

U.S. PATENT DOCUMENTS 12,149,478 B2 * 11/2024 Qi ..................... H04W 72/0446
2019/0053280 A1 2/2019 Rico Alvarino et al.
(Continued)

FOREIGN PATENT DOCUMENTS

WO 2020007313 A1 1/2020
WO 2020164352 A1 8/2020
WO 2021119127 A1 6/2021

OTHER PUBLICATIONS

International Search Report and Written Opinion—PCT/US2022/038218—ISA/EPO—Oct. 25, 2022.
(Continued)

*Primary Examiner* — Mohamed A Kamara
(74) *Attorney, Agent, or Firm* — Procopio, Cory, Hargreaves & Savitch LLP/QUALCOMM Incorporated

(57) ABSTRACT

Aspects presented herein may enable a UE to prioritize PRS and different DL channels in an RRC-inactive/idle state. In one aspect, a UE receives one or more PRSs and at least one DL channel in a measurement period and during an RRC-inactive state or an RRC-idle state, the one or more PRSs occupying a range of symbols that do not overlap with the at least one DL channel in time. The UE selects at least some portion of the one or more PRSs or at least some portion of the at least one DL channel for processing based on whether
(Continued)

the range of symbols is within a time threshold of the at least one DL channel. The UE processes, based on the selection, the at least some portion of the one or more PRSs or the at least some portion of the at least one DL channel.

30 Claims, 17 Drawing Sheets

(51) Int. Cl.

| | |
|---|---|
| ***H04W 24/08*** | (2009.01) |
| ***H04W 64/00*** | (2009.01) |
| ***H04W 72/232*** | (2023.01) |
| ***H04W 72/566*** | (2023.01) |

(52) U.S. Cl.
CPC ....... *H04W 72/232* (2023.01); *H04W 72/569* (2023.01)

(58) Field of Classification Search
CPC ...... H04W 72/23; H04L 5/0048; H04L 5/001; H04L 5/0044; H04L 5/0064; H04L 5/0053
See application file for complete search history.

(56) References Cited

U.S. PATENT DOCUMENTS

| | | | | |
|---|---|---|---|---|
| 2019/0327673 | A1* | 10/2019 | Bitra | H04W 52/0216 |
| 2021/0120519 | A1* | 4/2021 | Si | H04W 72/30 |
| 2022/0123879 | A1* | 4/2022 | Munier | H04W 64/00 |
| 2022/0357418 | A1* | 11/2022 | Wang | H04L 5/0069 |
| 2023/0283424 | A1* | 9/2023 | Rao | H04L 5/0048 370/329 |
| 2024/0306016 | A1* | 9/2024 | Kazmi | H04B 7/0602 |

OTHER PUBLICATIONS

OPPO: "Discussion on DL Reference Signals for NR Positioning", 3GPP TSG RAN WG1 #99, R1-1911847 vol. RAN WG1, No. Reno, USA, Nov. 18, 2019-Nov. 22, 2019, Nov. 8, 2019, 8 Pages, XP051819868, Sections 1-8.
OPPO: "Discussions on NR Positioning Enhancements", 3GPP TSG RAN WG1 #103-e, R1-2008226, vol. RAN WG1, No. e-Meeting; Oct. 26, 2020-Nov. 13, 2020, Oct. 16, 2020, 10 Pages, XP051940048, Sections 1-5.
Interdigital Inc: "Discussion on Enhancement for Latency Reduction", 3GPP TSG RAN WG2 #115-e R2-2107681, Electronic, Aug. 16-Aug. 27, 2021, pp. 1-5.

* cited by examiner

One Frame (TDD)
10 ms
subframe
RB
slot
200
D D D D D D D D D D D D F U
OFDM symbol
slot
subcarrier
DMRS R
CSI-RS
230
PDCCH CORESET
SSS
PSS
PDSCH
PBCH
REG 12 REs
1 CCE = 6 REGs
SS/PBCH Block
BWP
BWP
20 RBs
channel bandwidth RBs
250
U U U U U U U U U U U U U U
SRS
SRS Comb 0
SRS Comb 1
DMRS R
280
PUCCH
PUSCH

1300

1302 Receive, from a random access network (RAN) node, an indication of a priority associated with one or more PRSs and at least one DL channel – the UE may select at least some portion of the one or more positioning PRSs or at least some portion of the at least one DL channel for processing based on the indication 1304 Receive one or more PRSs and at least one DL channel in a measurement period and during an RRC-inactive state or an RRC-idle state - the one or more PRSs occupy a range of symbols that do not overlap with the at least one DL channel in time 1306 Select at least some portion of the one or more PRSs or at least some portion of the at least one DL channel for processing based on whether the range of symbols is within a time threshold of the at least one DL channel 1308 Adjust a measurement period factor to increase the measurement period based on whether the range of symbols is within the time threshold of the at least one DL channel 1310 Process, based on the selection, the at least some portion of the one or more PRSs or the at least some portion of the at least one DL channel 1312 Report a location estimate based on the one or more PRSs or communicate via the at least one DL channel

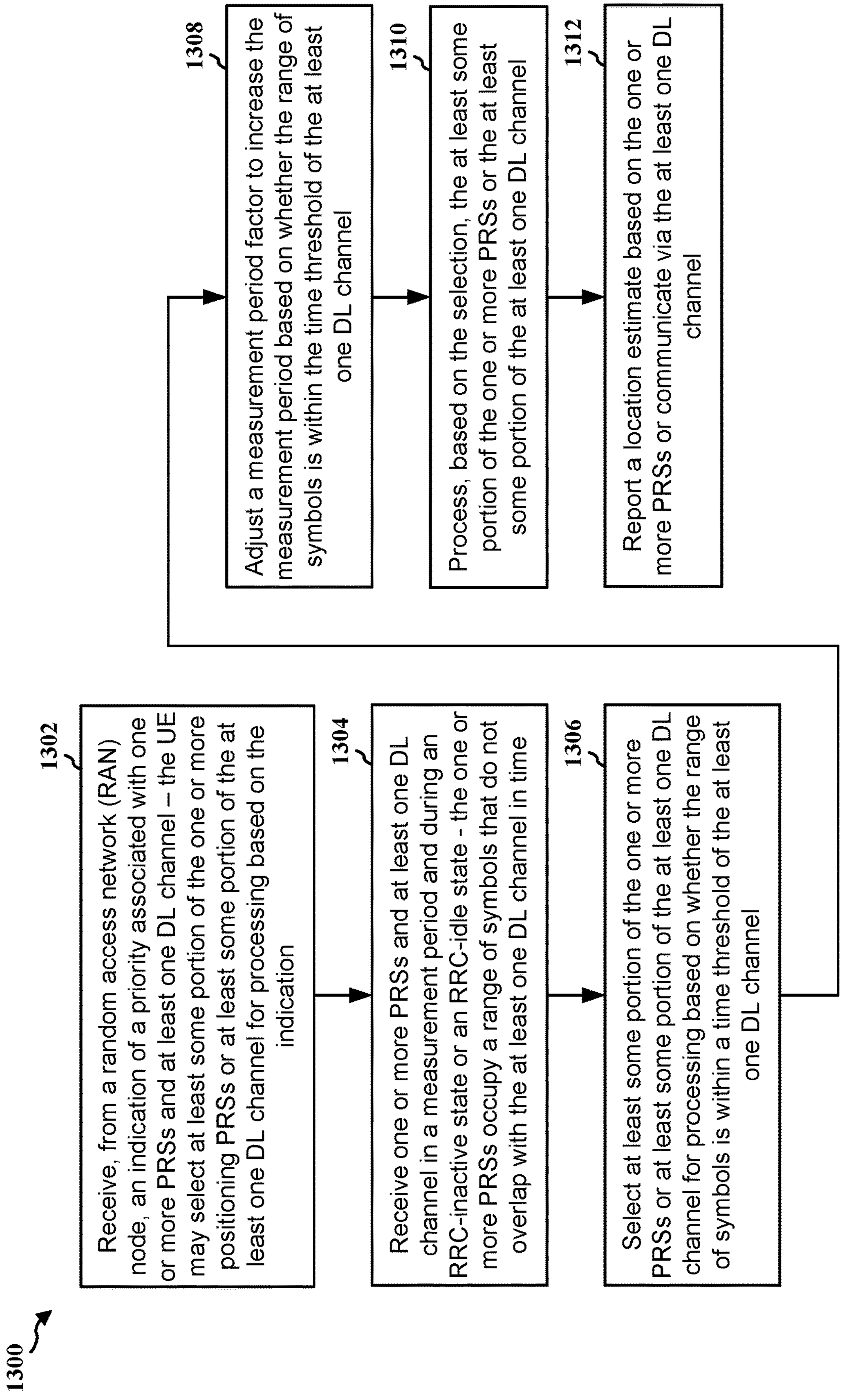

FIG. 13

SOFT COLLISION BETWEEN PRS AND OTHER CHANNELS IN RRC INACTIVE AND IDLE MODES

CROSS REFERENCE TO RELATED APPLICATIONS

This application is a National Stage Application filed under 35 U.S.C. § 371 of PCT International Application Serial No. PCT/US2022/038218 entitled "SOFT COLLISION BETWEEN PRS AND OTHER CHANNELS IN RRC INACTIVE AND IDLE MODES" and filed on Jul. 25, 2022, which claims the benefit and priority to Greek application No. 20210100564, entitled "SOFT COLLISION RULES, PRIORITIES AND PROCEDURES BETWEEN PRS AND OTHER CHANNELS IN RRC INACTIVE AND IDLE USER EQUIPMENTS" and filed on Aug. 20, 2021, which are expressly incorporated by reference herein in their entirety.

TECHNICAL FIELD

The present disclosure relates generally to communication systems, and more particularly, to wireless communications involving signal processing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives one or more positioning reference signals (PRSs) and at least one downlink (DL) channel in a measurement period and during a radio resource control (RRC)-inactive state or an RRC-idle state, the one or more PRSs occupying a range of symbols that do not overlap with the at least one DL channel in time. The apparatus selects at least some portion of the one or more PRSs or at least some portion of the at least one DL channel for processing based on whether the range of symbols is within a time threshold of the at least one DL channel. The apparatus processes, based on the selection, the at least some portion of the one or more PRSs or the at least some portion of the at least one DL channel.

In an aspect of the disclosure, a method, a computer-readable medium, and an apparatus are provided. The apparatus transmits, to a location management function (LMF), a location of at least one broadcast channel. The apparatus transmits, to the LMF, an indication of a priority associated with one or more PRSs and the at least one broadcast channel. The apparatus transmits, to a user equipment (UE), the indication of the priority associated with the one or more PRSs and the at least one broadcast channel.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a flowchart of a method of wireless communication in accordance with aspects presented herein.

DETAILED DESCRIPTION

Figure 1:
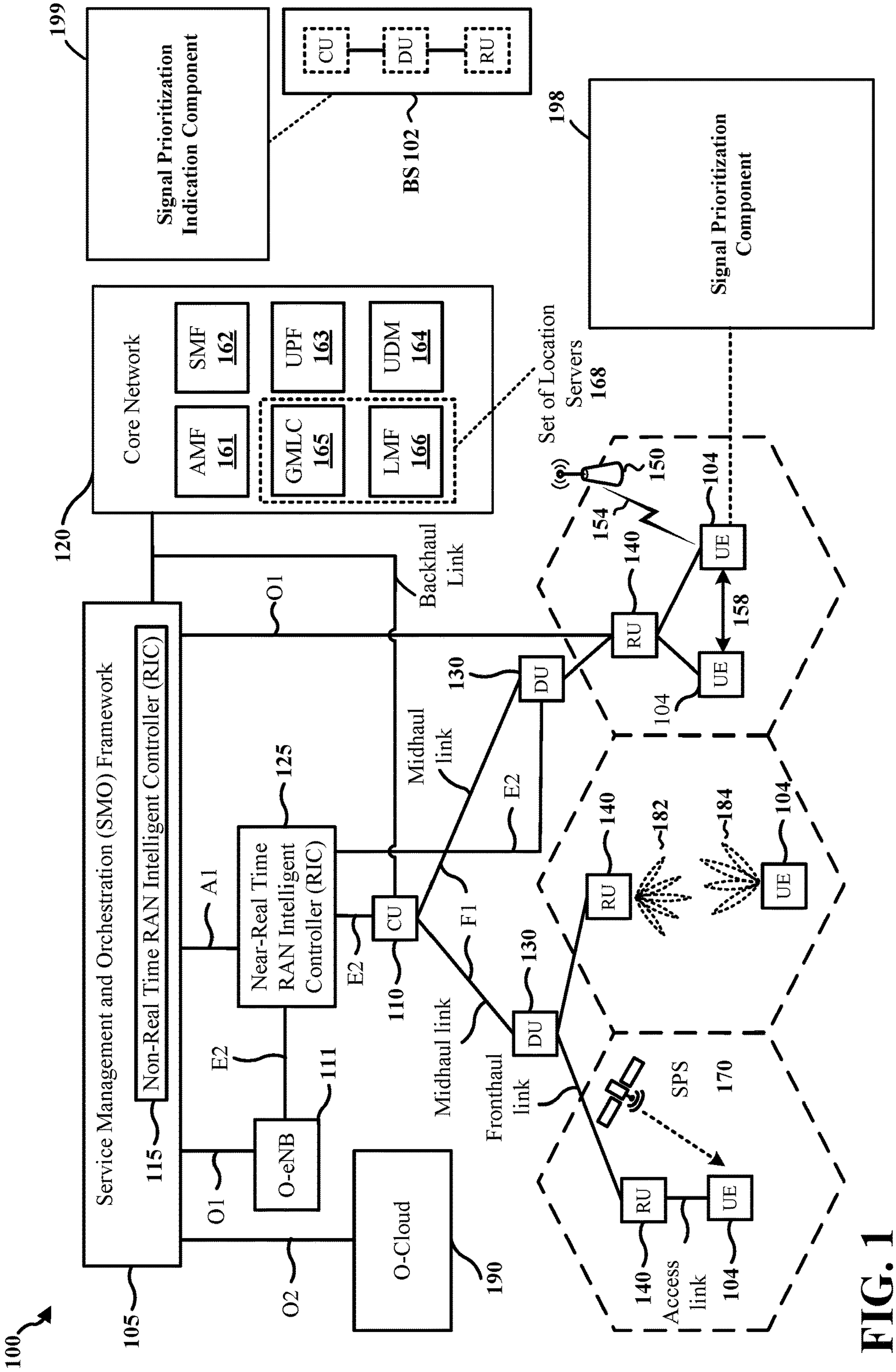
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit—User Plane (CU-UP)), control plane functionality (i.e., Central Unit—Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In certain aspects, the UE 104 may include a signal prioritization component 198 configured to prioritize PRS and/or one or more DL channels if the UE 104 is configured to measure the PRS and the one or more channels that are close in time and the UE is in an RRC inactive state or an RRC idle state. In one configuration, the signal prioritization component 198 may be configured to receive one or more PRSs and at least one DL channel in a measurement period and during an RRC-inactive state or an RRC-idle state, the one or more PRSs occupying a range of symbols that do not overlap with the at least one DL channel in time. In such configuration, the signal prioritization component 198 may select at least some portion of the one or more PRSs or at least some portion of the at least one DL channel for processing based on whether the range of symbols is within a time threshold of the at least one DL channel. In such configuration, the signal prioritization component 198 may process, based on the selection, the at least some portion of the one or more PRSs or the at least some portion of the at least one DL channel.

In certain aspects, the base station 102/180 (or a network entity associated with the base station 102/180, a random access network, etc.) may include a signal prioritization indication component 199 that is capable of indicating priority associated with PRS and different types of DL channels to a UE and an LMF. In one configuration, the signal prioritization indication component 199 may be configured to transmit, to an LMF, a location of at least one broadcast channel. In such configuration, the signal prioritization indication component 199 may transmit, to the LMF, an indication of a priority associated with one or more PRSs and the at least one broadcast channel. In such configuration, the signal prioritization indication component 199 may transmit, to a UE, the indication of the priority associated with the one or more PRSs and the at least one broadcast channel.

Figures 2A, 2B, 2C, 2D:
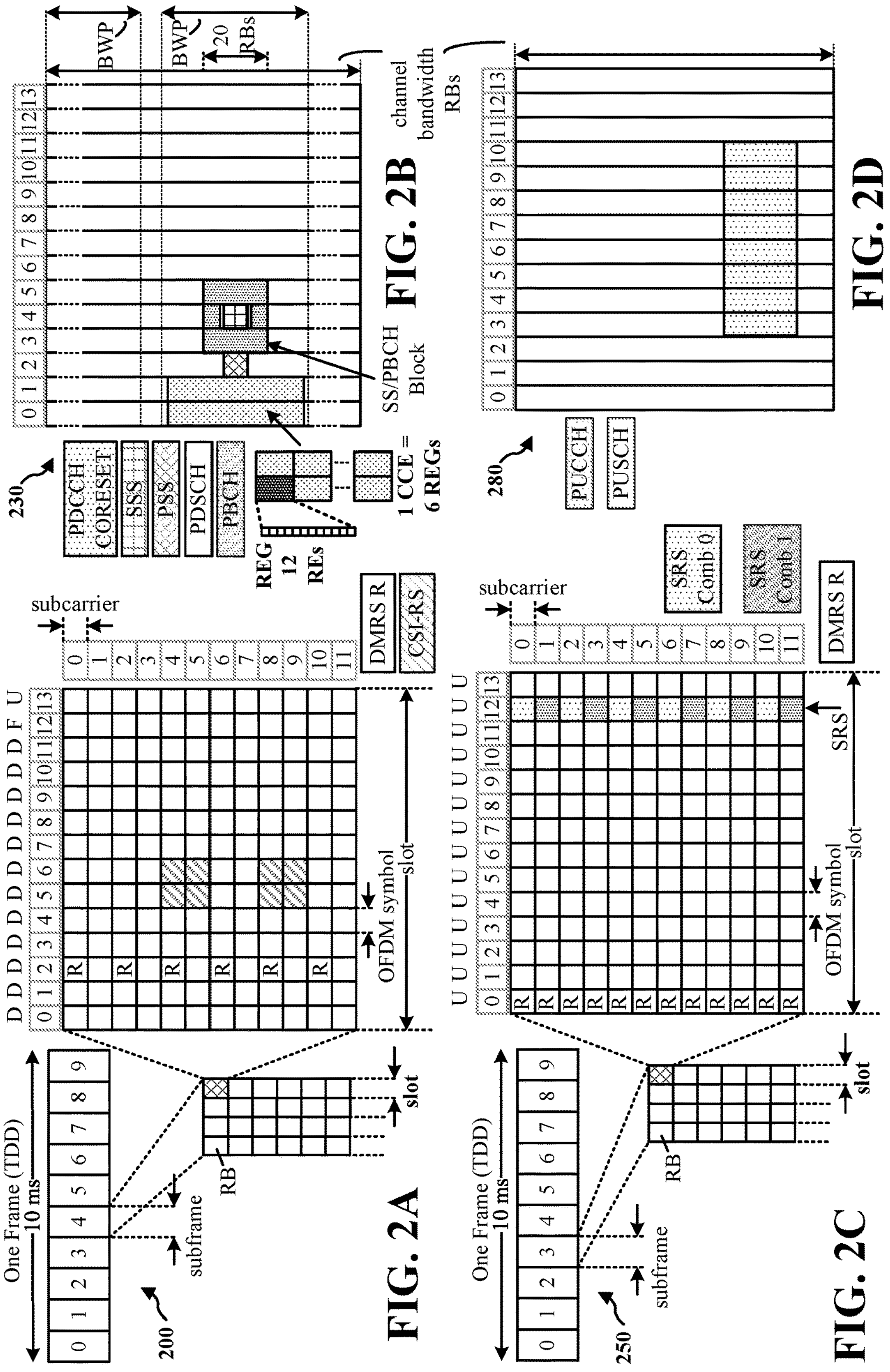
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS (see Table 1).

TABLE 1

| Numerology, SCS, and CP | | |
|---|---|---|
| $\mu$ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
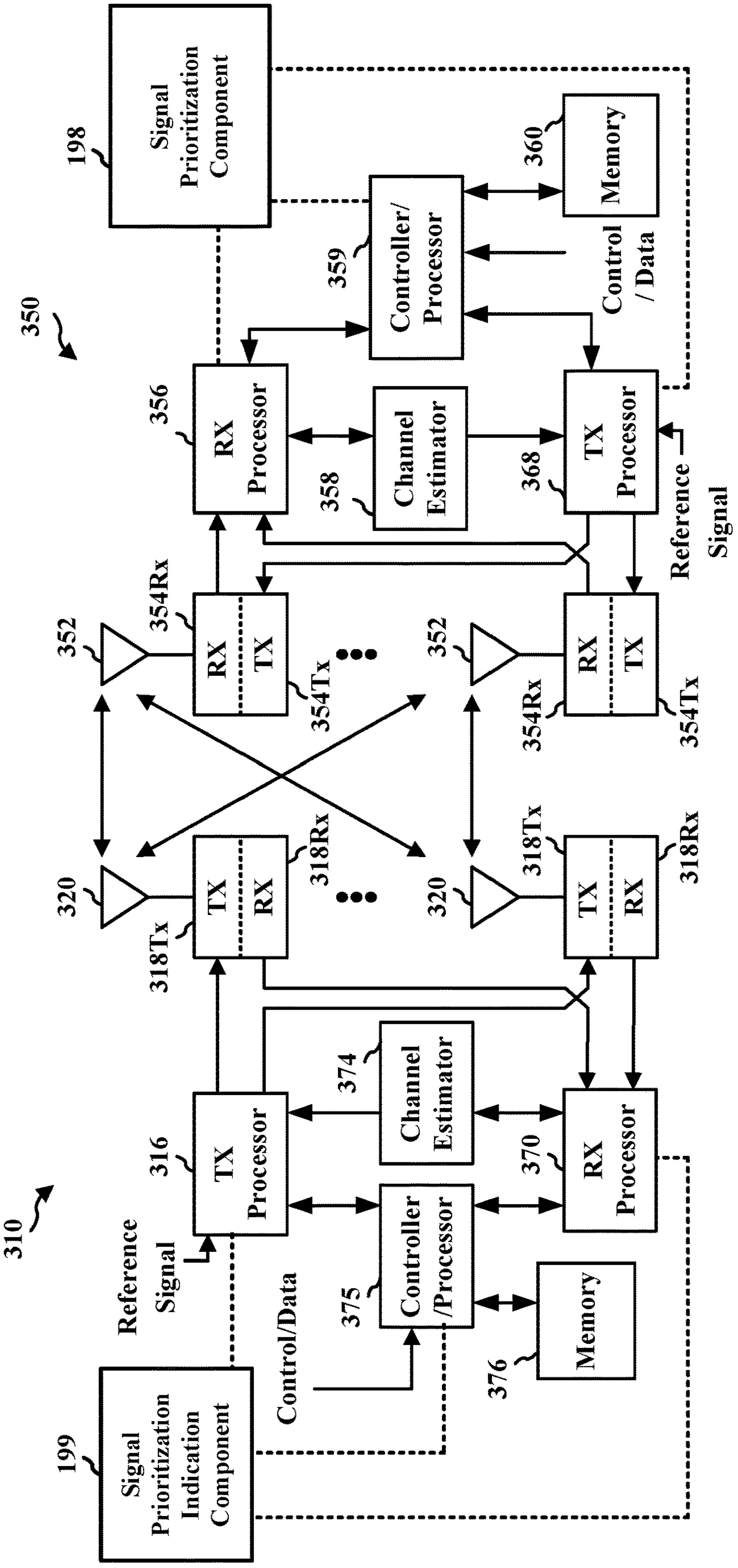
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the signal prioritization component 198 of FIG. 1.

At least one of the TX processor 316, the RX processor 370, and the controller/processor 375 may be configured to perform aspects in connection with the signal prioritization indication component 199 of FIG. 1.

A UE may use a random access channel (RACH) procedure, which may also be referred to as an "initial access procedure" or a "random access procedure," in order to initiate communication with a base station, such as to request a radio resource control (RRC) connection, to re-establish an RRC connection, and/or to resume an RRC connection with the base station, etc.

Figure 4:
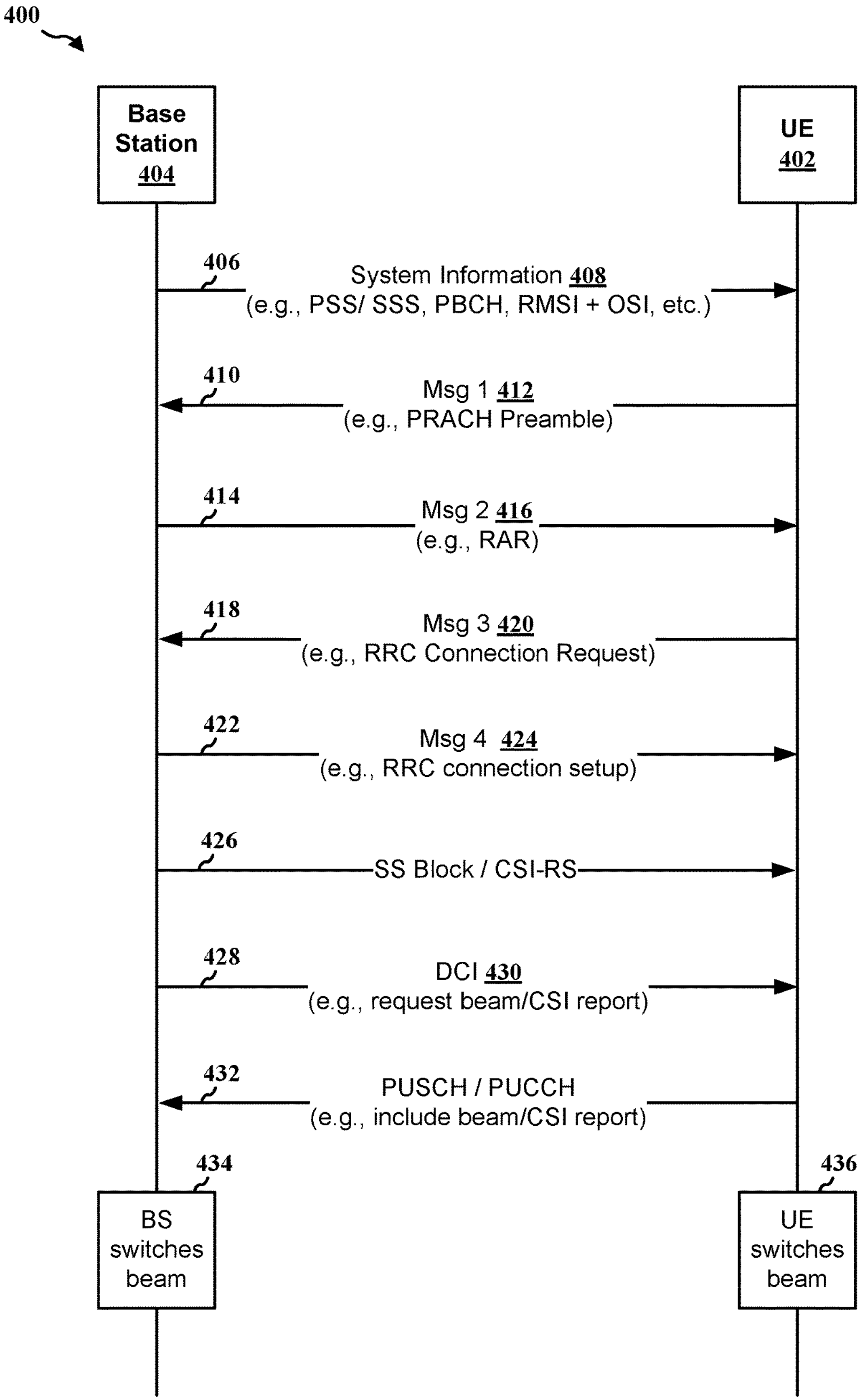
FIG. 4 is a communication flow illustrating example aspects of a random access channel (RACH) procedure between a UE and a base station in accordance with various aspects of the present disclosure.

FIG. 4 is a communication flow 400 illustrating example aspects of a RACH procedure between a UE and a base station in accordance with various aspects of the present disclosure. At 410, a UE 402 may initiate a random access message exchange (e.g., the RACH procedure) by transmitting, to a base station 404, a first random access message 412 (e.g., Msg 1), which may include a preamble. The UE 402 may transmit the first random access message 412 based on RACH resources configured by the base station 404. For example, prior to sending the first random access message 412, the UE 402 may obtain random access parameters, e.g., including preamble format parameters, time and frequency resources, parameters for determining root sequences and/or cyclic shifts for a random access preamble, etc., in system information 408 transmitted/broadcasted from the base station 404, such as shown at 406. The preamble may be transmitted with an identifier, such as a random access-radio network temporary identifier (RA-RNTI). The UE 402 may randomly select a random access preamble sequence, e.g., from a set of preamble sequences. In some examples, a preamble sequence may be assigned to the UE 402. The system information 408 may include one or more of a primary synchronization signal (PSS), a secondary synchronization signal (SSS), a physical broadcast channel (PBCH), remaining minimum system information (RMSI), and/or other system information (OSI), etc. Based on the system information 408, the UE 402 may identify a good or suitable beam during synchronization, and the UE 402 may decode a master information block (MIB) and/or a system information block (SIB) on that beam.

At 414, the base station may respond to the first random access message 412 by sending a second random access message 416 (e.g., Msg 2), where the second random access message 416 may be a physical downlink shared channel (PDSCH) and/or a physical downlink control channel (PDCCH) that includes a random access response (RAR). The RAR may include, e.g., an identifier of the random access preamble sent by the UE, a timing advance (TA), an uplink grant for the UE to transmit data, a cell radio network temporary identifier (C-RNTI) or other identifier, and/or a back-off indicator, etc.

At 418, after receiving the second random access message 416, the UE 402 may transmit a third random access message 420 (e.g., Msg 3) to the base station 404, such as via a physical uplink shared channel (PUSCH). The third random access message 420 may include an RRC connection request, an RRC connection re-establishment request, or an RRC connection resume request depending on the trigger for the initiating the RACH procedure.

At 422, the base station 404 may complete the RACH procedure by sending a fourth random access message 424 (e.g., Msg 4) to the UE 402, where the fourth random access message may include a PDCCH for scheduling and a PDSCH for carrying the message. For example, the fourth random access message 424 may include a random access response message that includes timing advancement information, contention resolution information, and/or RRC connection setup information. The UE 402 may monitor for the PDCCH in the fourth random access message 424, such as based on the C-RNTI. If the PDCCH is successfully received and decoded, the UE 402 may also decode the PDSCH corresponding to the PDCCH. The UE 402 may send HARQ feedback for any data carried in the fourth random access message. In some examples, the fourth random access message may be referred to as a contention resolution message. The fourth random access message 424 may complete the RACH procedure. Thus, the UE 402 may then transmit uplink communication and/or receive downlink communication with the base station 404 based on the RAR (e.g., from the second random access message 416) and the fourth random access message 424. As four random access messages may be exchanged during a RACH procedure, the RACH procedure may also be referred to as a four-step RACH procedure.

At 426, the base station 404 may transmit a synchronization signal block and/or a channel state information-reference signal (CSI-RS). For example, for UEs in an RRC CONNECTED state, CSI-RSs may be configured for UEs in order to improve the quality of UE measurements. The SSBs may be blindly decoded by the UEs, and UEs may use SSBs for reference signal received power (RSRP) and/or reference signal received quality (RSRQ) measurements.

In some examples, at 428, the base station 404 may request the UE 402 to provide beam report and/or CSI reporting, where the base station may transmit the request via downlink control information (DCI) 430.

At 432, in response to the request, the UE 402 may transmit a corresponding beam/CSI report to the base station 404, such as via a PUSCH/PUCCH. In some examples, based on the beam/CSI report, the base station 404 and/or the UE 402 may switch their transmitting beam(s) and/or receiving beam(s), such as shown at 434 and 436.

After a random-access procedure, a UE may be in an RRC_connected state. The RRC protocol may be used on an air interface between a UE and a base station. The major functions of the RRC protocol may include connection establishment and release functions, broadcast of system information, radio bearer establishment, reconfiguration, and release, RRC connection mobility procedures, paging notification and release, and/or outer loop power control, etc. In some examples, such as in LTE, a UE may be in one of two RRC states (e.g., a connected state or an idle state). In other examples, such as in NR, a UE may be in one of three RRC states (a connected state, an idle state, or an inactive state). The different RRC states may have different radio resources associated with each state that a UE may use when the UE is in a given state. In some examples, the RRC states may also be referred to as RRC modes.

Figure 5:
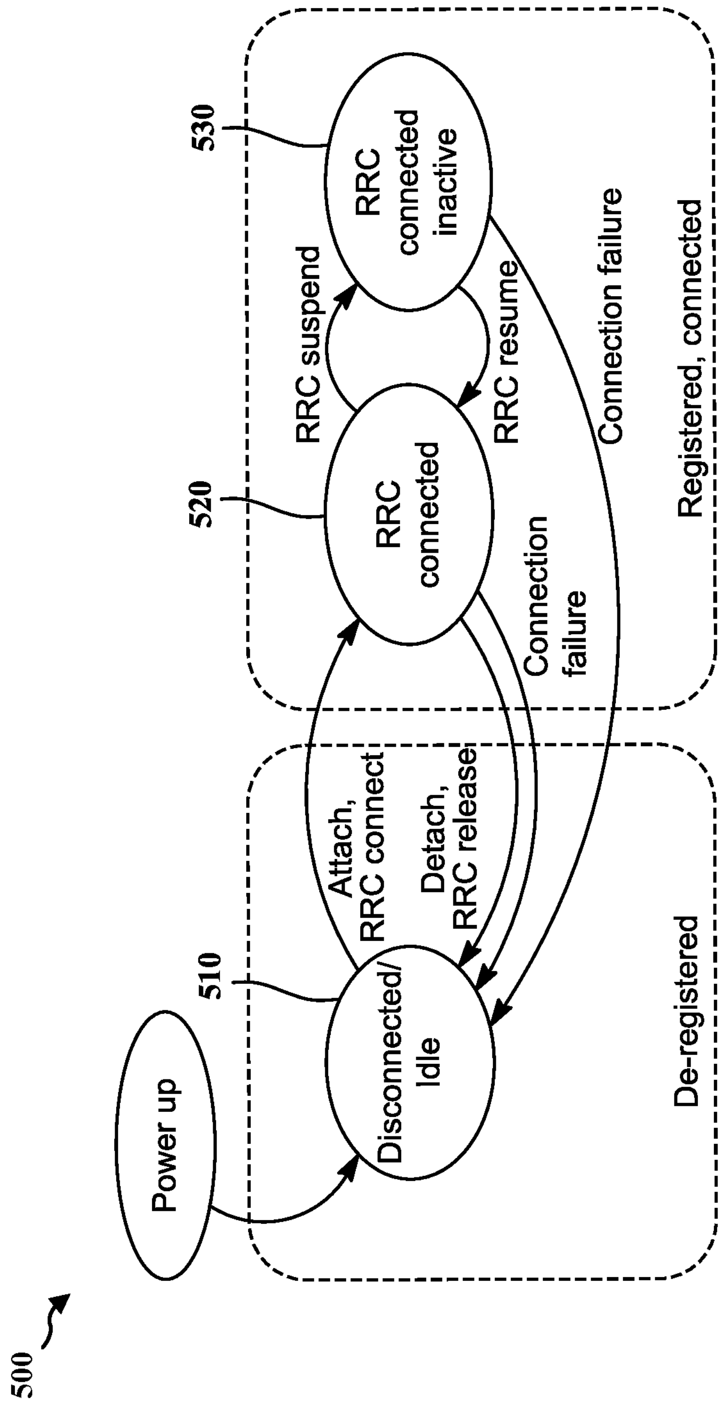
FIG. 5 is a diagram illustrating an example of different radio resource control (RRC) states in accordance with various aspects of the present disclosure.

FIG. 5 is a diagram 500 illustrating an example of different RRC states in accordance with various aspects of the present disclosure. When a UE is powered up, the UE may initially be in an RRC disconnected/idle state 510. After a random access procedure, the UE may move to an RRC connected state 520. If there is no activity at the UE for a defined duration, the UE may suspend its session by transitioning to an RRC inactive state 530. The UE may resume its session by performing a random access procedure to transition back to the RRC connected state 520. Thus, the UE may be specified to perform a random access procedure to transition to the RRC connected state 520, regardless of whether the UE is in the RRC idle state 510 or the RRC inactive state 530. As such, the RRC inactive state 530 may be a state between the RRC connected state 520 and the RRC disconnected/idle state 510 where the UE may optionally stay in an inactive state without completely releasing the RRC when there is no traffic and quickly switch back to connected states when necessary.

In some examples, the RRC idle state 510 may be used for public land mobile network (PLMN) selection, broadcast of system information, cell re-selection mobility, paging for mobile terminated data (initiated and managed by the 5GC), and/or discontinuous reception (DRX) for core network paging (configured by non-access stratum (NAS)), etc. In other examples, the RRC connected state 520 may be used for 5GC and new RAN connection establishment (both control and user planes), UE context storage at the new RAN and the UE, new RAN knowledge of the cell to which the UE belongs, transfer of unicast data to/from the UE, and/or network controlled mobility, etc. In other examples, the RRC inactive state 530 may be used for the PLMN selection, broadcast of system information, cell re-selection for mobility, paging (initiated by the new RAN), RAN-based notification area (RNA) management (by the new RAN), DRX for RAN paging (configured by the new RAN), 5GC and new RAN connection establishment for the UE (both control and user planes), storage of the UE context in the new RAN and the UE, and/or new RAN knowledge of the RNA to which the UE belongs, etc.

Figure 6:
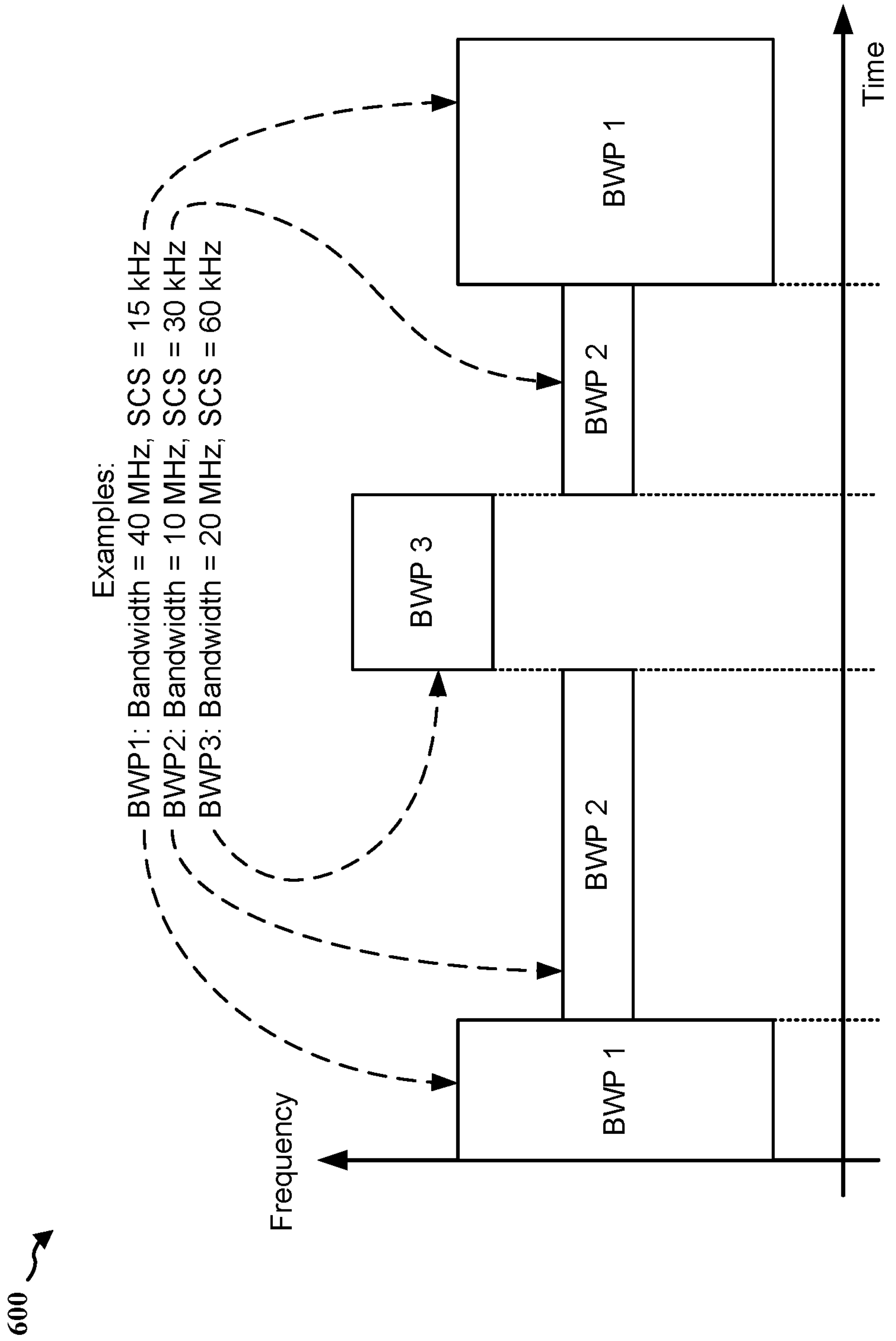
FIG. 6 is a diagram illustrating an example of bandwidth parts (BWPs) in accordance with various aspects of the present disclosure.

FIG. 6 is a diagram 600 illustrating an example of bandwidth parts (BWPs) in accordance with various aspects of the present disclosure. A channel bandwidth, or a system bandwidth, may be divided into multiple BWPs. A BWP may be a contiguous set of resource blocks (RBs) selected from a contiguous subset of common RBs for a given numerology (u) on a given carrier. In some examples, a maximum of four BWPs may be specified in the downlink and the uplink. In other words, a UE may be configured with up to four BWPs on the downlink, and/or up to four BWPs on the uplink. A UE may activate one BWP (e.g., uplink or downlink) at a given time, where the UE may receive or transmit over one BWP at a time. On the downlink, the bandwidth of each BWP may be greater than or equal to the bandwidth of an SSB, but it may or may not contain the SSB. In some examples, based on bandwidth adaptation (BA), the receive and transmit bandwidth of a UE may be adjusted (e.g., to a subset of total cell bandwidth). For example, a UE may use a narrower BW (e.g., BWP 2) for monitoring control channels and to receive small/medium amount of data (to save power), and the UE may switch to a full or larger BW (e.g., BWP 1) when large amounts of data are to be scheduled. The BA may be achieved by configuring the UE with BWP(s) and indicating to the UE which of the configured BWPs is currently the active one.

Figure 7:
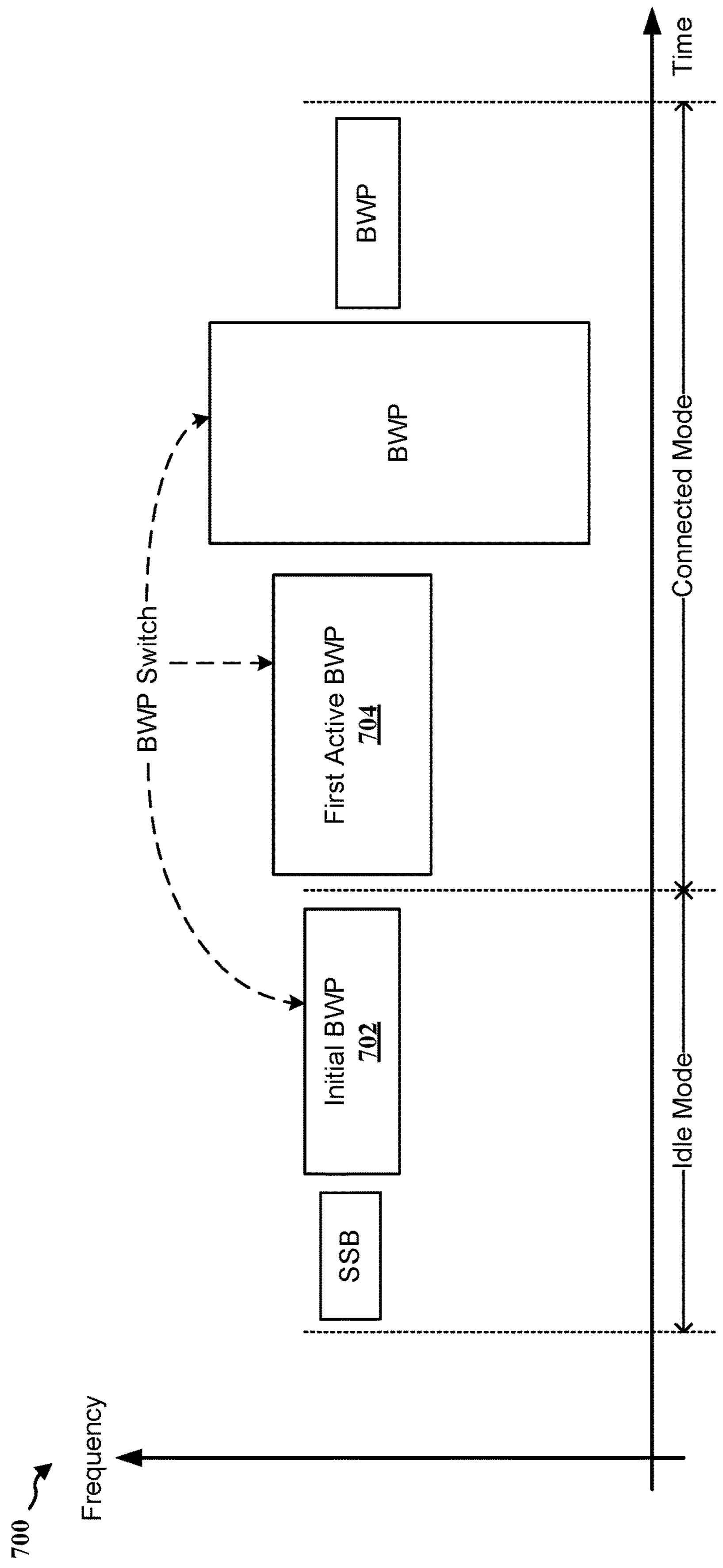
FIG. 7 is a diagram illustrating an example of different types of BWPs in accordance with various aspects of the present disclosure.

FIG. 7 is a diagram 700 illustrating an example of different types of BWPs in accordance with various aspects of the present disclosure. BWPs that are configured for an idle mode (e.g., under the RRC idle state 510) may typically be smaller than BWPs configured for a connected mode (e.g., under the RRC connected state 520). In some examples, there may be at least three types of BWPs that are available: an initial BWP 702, an active BWP 704 (e.g., UE specific), and/or a default BWP (e.g., UE specific). The initial BWP 702 may be used for performing an initial access process, such as described in connection with FIG. 4. For example, the initial BWP 702 may include parameters like RMSI, control resource set (CORESET), and/or RMSI frequency location/bandwidth/SCS, etc. The initial BWP 702 may be 24 to 96 physical resource blocks (PRBs) with different settings and relaxed to a wider BWP after RMSI decoding. The active BWP 704 may be defined as UE specific, which may also be used in association with the initial access process. The active BWP 704 may be the first BWP in which a UE may start data transfer after RRC configuration/reconfiguration. The very first active BWP may not be the same as the default BWP. The default BWP may also be UE specific and may be configured during RRC reconfiguration. In some example, if a default BWP is not configured for a UE, the UE may assume that the initial BWP is the default BWP. A UE may be configured to switch back to a default BWP when a BWP timer expires.

A network may support a number of cellular network-based positioning technologies, such as downlink-based, uplink-based, and/or downlink-and-uplink-based positioning methods. Downlink-based positioning methods may include an observed time difference of arrival (OTDOA) (e.g., in LTE), a downlink time difference of arrival (DL-TDOA) (e.g., in NR), and/or a downlink angle-of-departure (DL-AoD) (e.g., in NR). In an OTDOA or DL-TDOA positioning procedure, a UE may measure the differences between each time of arrival (ToA) of reference signals (e.g., positioning reference signals (PRS)) received from pairs of base stations, referred to as reference signal time difference (RSTD) or time difference of arrival (TDOA) measurements, and report them to a positioning entity. For example, the UE may receive identifiers (IDs) of a reference base station (e.g., a serving base station) and multiple non-reference base stations in assistance data. The UE may then measure the RSTD between the reference base station and each of the non-reference base stations. Based on the known locations of the involved base stations and the RSTD measurements, the positioning entity can estimate the UE's location. In other words, a UE's position may be estimated based on measuring reference signals transmitted between the UE and one or more base stations and/or transmission reception points (TRPs) of the one or more base stations.

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDOA and UL-AoA. UL-TDOA is similar to DL-TDOA, but is based on uplink reference signals (e.g., sounding reference signals (SRSs)) transmitted by the UE. For UL-AoA positioning, one or more base stations may measure the received signal strength of one or more uplink reference signals (e.g., SRS) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a positioning reference signal (PRS) or SRS) to a responder (a UE or base station), which transmits an RTT response signal (e.g., an SRS or PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

The E-CID positioning method may be based on radio resource management (RRM) measurements. In E-CID, the UE may report the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., a location server, an LMF, a secure user plane location (SUPL) location platform (SLP)) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and include coordinates (e.g., latitude, longitude, and possibly altitude) or may be civic and include a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). For purposes of the present disclosure, reference signals may include positioning reference signal (PRS), tracking reference signals (TRS), phase tracking reference signals (PTRS), cell-specific reference signals (CRS), CSI-RS, demodulation reference signals (DMRS), PSS, SSS, SSBs, SRS, etc., depending on whether the illustrated frame structure is used for uplink or downlink communication. In some examples, a collection of resource elements (REs) that are used for transmission of PRS may be referred to as a "PRS resource." The collection of resource elements may span multiple PRBs in the frequency domain and one or more consecutive symbol(s) within a slot in the time domain. In a given OFDM symbol in the time domain, a PRS resource may occupy consecutive PRBs in the frequency domain. In other examples, a "PRS resource set" may refer to a set of PRS resources used for the transmission of PRS signals, where each PRS resource may have a PRS resource ID. In addition, the PRS resources in a PRS resource set may be associated with a same TRP. A PRS resource set may be identified by a PRS resource set ID and may be associated with a particular TRP (e.g., identified by a TRP ID). In addition, the PRS resources in a PRS resource set may have a same periodicity, a common muting pattern configuration, and/or a same repetition factor across slots.

The periodicity may be a time from a first repetition of a first PRS resource of a first PRS instance to the same first repetition of the same first PRS resource of the next PRS instance. For example, the periodicity may have a length selected from 2^μ*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots. A PRS resource ID in a PRS resource set may be associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." In some examples, a "PRS instance" or "PRS occasion" may be one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," and/or a "repetition," etc.

A "positioning frequency layer (PFL)" (which may also be referred to as a "frequency layer") may be a collection of one or more PRS resource sets across one or more TRPs that have the same values for certain parameters. Specifically, the collection of PRS resource sets may have a same subcarrier spacing and cyclic prefix (CP) type (e.g., meaning all numerologies supported for PDSCHs are also supported for PRS), the same Point A, the same value of the downlink PRS bandwidth, the same start PRB (and center frequency), and/or the same comb-size, etc. The Point A parameter may take the value of a parameter ARFCN-ValueNR (where "ARFCN" stands for "absolute radio-frequency channel number") and may be an identifier/code that specifies a pair of physical radio channel used for transmission and reception. In some examples, a downlink PRS bandwidth may have a granularity of four PRBs, with a minimum of 24 PRBs and a maximum of 272 PRBs. In other examples, up to four frequency layers may be configured, and up to two PRS resource sets may be configured per TRP per frequency layer.

The concept of a frequency layer may be similar to component carrier (CC) and BWP, where CCs and BWPs may be used by one base station (or a macro cell base station and a small cell base station) to transmit data channels, while frequency layers may be used by multiple (e.g., three or more) base stations to transmit PRS. A UE may indicate the number of frequency layers it is capable of supporting when the UE sends the network its positioning capabilities, such as during a positioning protocol session. For example, a UE may indicate whether it is capable of supporting one or four PFLs.

Figure 8:
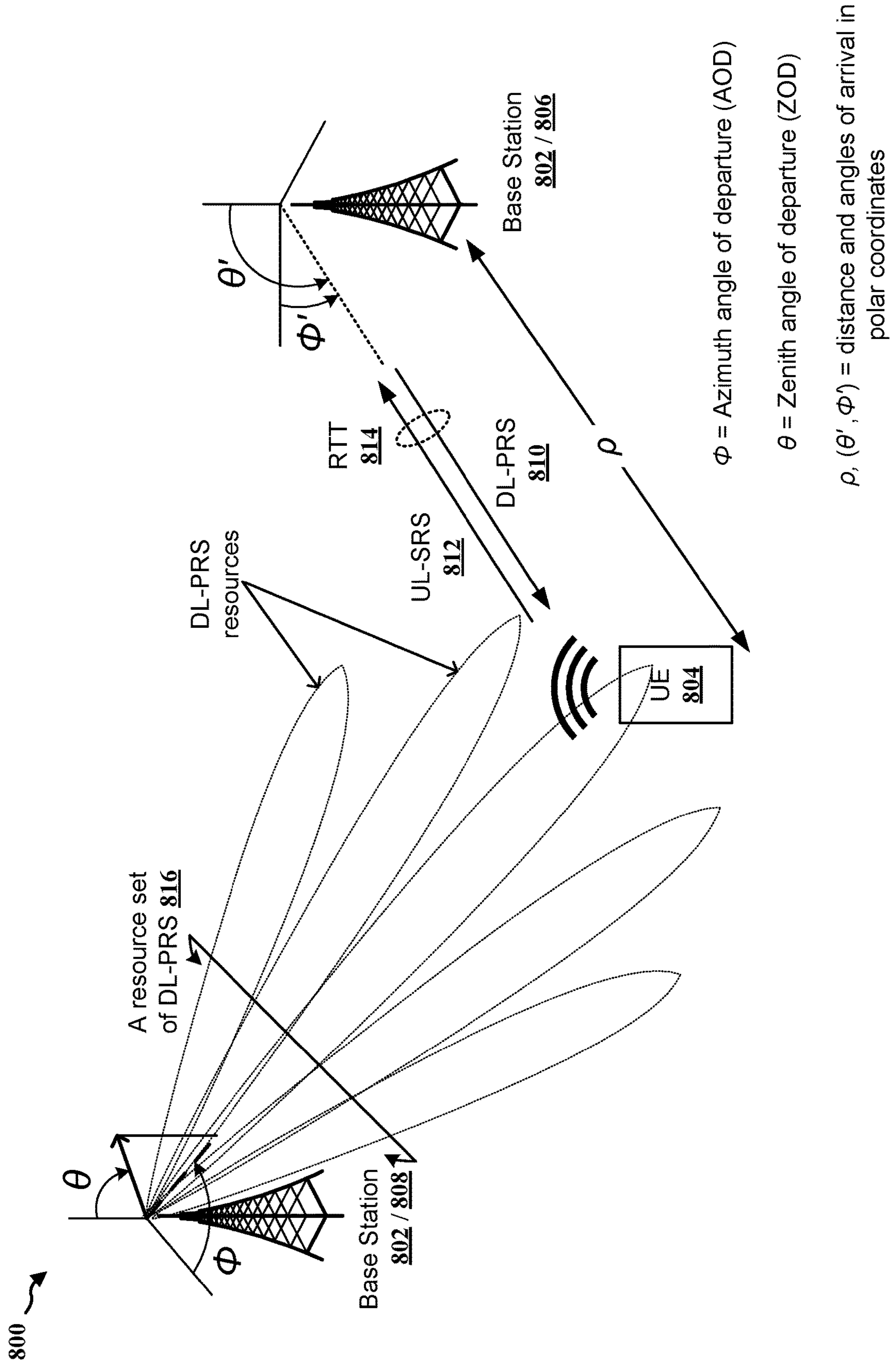
FIG. 8 is a diagram illustrating an example of a UE positioning based on reference signal measurements in accordance with various aspects of the present disclosure.

FIG. 8 is a diagram 800 illustrating an example of a UE positioning based on reference signal measurements in accordance with various aspects of the present disclosure. In one example, a location of UE 804 may be estimated based on multi-cell round trip time (multi-RTT) measurements, where multiple base stations 802 may perform round trip time (RTT) measurements for signals transmitted to and received from the UE 804 to determine the approximate distance of UE 804 with respect to each of the multiple base stations 802. Similarly, the UE 804 may perform RTT measurements for signals transmitted to and received from the base stations 802 to determine each base station's approximate distance with respect to the UE 804. Then, based at least in part on the approximate distances of UE 804 with respect to the multiple base stations 802, a location management function (LMF) that is associated with the base stations 802 and/or the UE 804 may estimate the position of UE 804. For example, a base station 806 may transmit at least one downlink positioning reference signal (DL-PRS) 810 to the UE 804, and may receive at least one uplink sounding reference signal (UL-SRS) 812 transmitted from the UE 804. Based at least in part on measuring an RTT 814 between the DL-PRS 810 transmitted and the UL-SRS 812 received, the base station 806 or an LMF associated with the base station 806 may identify the position of UE 804 (e.g., distance) with respect to the base station 806. Similarly, the UE 804 may transmit UL-SRS 812 to the base station 806, and may receive DL-PRS 810 transmitted from the base station 806. Based at least in part on measuring the RTT 814 between the UL-SRS 812 transmitted and the DL-PRS 810 received, the UE 804 or an LMF associated with the UE 804 may identify the position of base station 806 with respect to the UE 804. The multi-RTT measurement mechanism may be initiated by the LMF that is associated with the base station 806/808 and/or the UE 804. A base station may configure UL-SRS resources to a UE via radio resource control (RRC) signaling. In some examples, the UE and the base station (or TRPs of the base station) may report the multi-RTT measurements to the LMF, and the LMF may estimate the UE's position based on the reported multi-RTT measurements.

In other examples, a UE's position may be estimated based on multiple antenna beam measurements, where a downlink angle of departure (DL-AoD) and/or uplink angle of arrival (UL-AoA) of transmissions between a UE and one or more base stations/TRPs may be used to estimate the UE's position and/or the UE's distance with respect to each base station/TRP. For example, referring back to FIG. 6, with regard to the DL-AoD, the UE 804 may perform reference signal received power (RSRP) measurements for a set of DL-PRS 816 transmitted from multiple transmitting beams (e.g., DL-PRS beams) of a base station 808, and the UE 804 may provide the DL-PRS beam measurements to a serving base station (or to the LMF associated with the base station). Based on the DL-PRS beam measurements, the serving base station or the LMF may derive the azimuth angle (e.g., Φ) of departure and the zenith angle (e.g., θ) of departure for DL-PRS beams of the base station 808. Then, the serving base station or the LMF may estimate the position of UE 804 with respect to the base station 808 based on the azimuth angle of departure and the zenith angle of departure of the DL-PRS beams. Similarly, for the UL-AoA, a UE's position may be estimated based on UL-SRS beam measurements measured at different base stations, such as at the base stations 802. Based on the UL-SRS beam measurements, a serving base station or an LMF associated with the serving base station may derive the azimuth angle of arrival and the zenith angle of arrival for UL-SRS beams from the UE, and the serving base station or the LMF may estimate the UE's position and/or the UE distance with respect to each of the base stations based on the azimuth angle of arrival and the zenith angle of arrival of the UL-SRS beams.

Figure 9B:
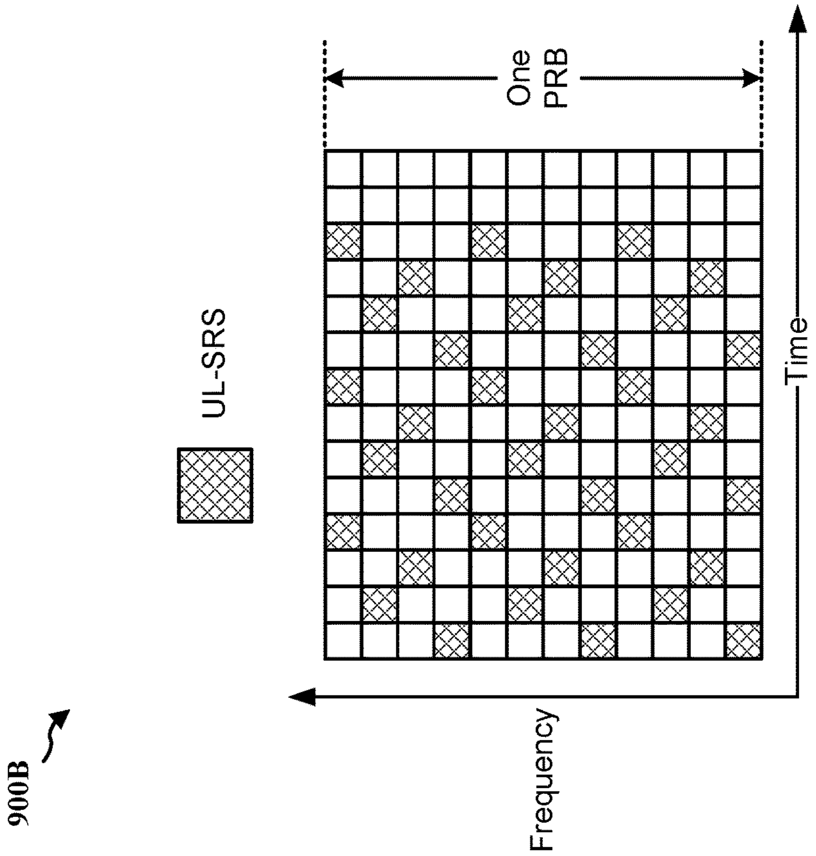
FIG. 9B is a diagram illustrating an example of uplink-sounding reference signal (UL-SRS) transmitted from a UE in accordance with various aspects of the present disclosure.
Figure 9A:
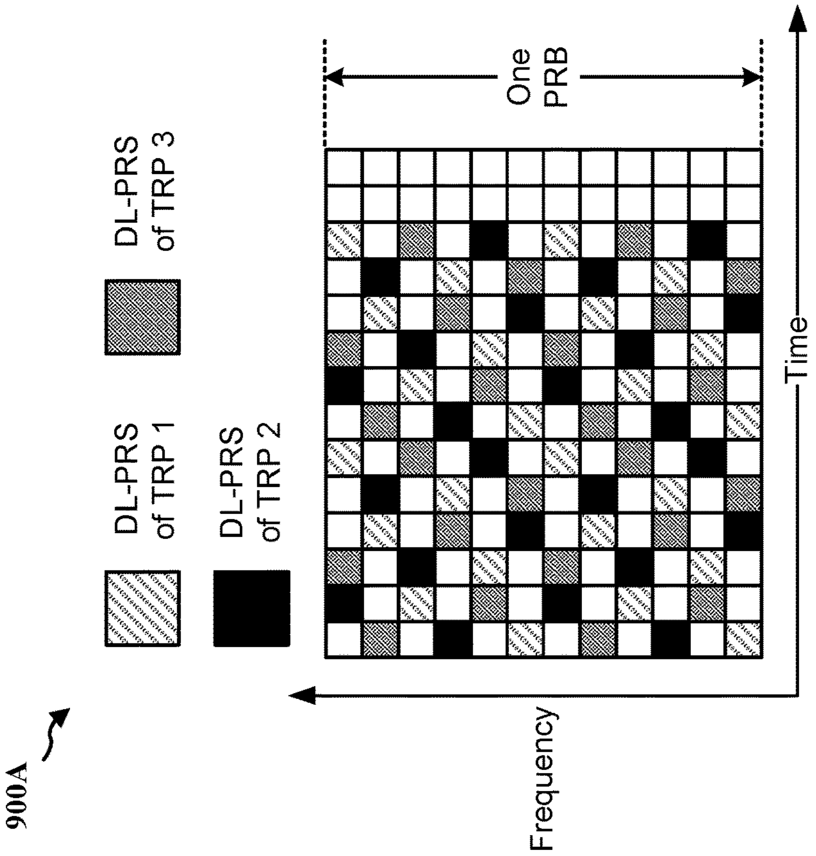
FIG. 9A is a diagram illustrating an example of downlink-positioning reference signal (DL-PRS) transmitted from multiple transmission reception points (TRPs)/base stations in accordance with various aspects of the present disclosure.

FIG. 9A is a diagram 900A illustrating an example of DL-PRS transmitted from multiple TRPs/base stations in accordance with various aspects of the present disclosure. In one example, a serving base station may configure DL-PRS to be transmitted from one or more TRPs/base stations within a slot or across multiple slots. If the DL-PRS is configured to be transmitted within a slot, the serving base station may configure the starting resource element in time and frequency from each of the one or more TRPs/base stations. If the DL-PRS is configured to be transmitted across multiple slots, the serving base station may configure gaps between DL-PRS slots, periodicity of the DL-PRS, and/or density of the DL-PRS within a period. The serving base station also may configure the DL-PRS to start at any physical resource block (PRB) in the system bandwidth. In one example, the system bandwidth may range from 24 to 276 PRBs in steps of 4 PRBs (e.g., 24, 28, 32, 36, etc.). The serving base station may transmit the DL-PRS in PRS beams, where a PRS beam may be referred to as a "PRS resource" and a full set of PRS beams transmitted from a TRP on a same frequency may be referred to as a "PRS resource set" or a "resource set of PRS," such as described in connection with FIG. 8. As shown by FIG. 9A, the DL-PRS transmitted from different TRPs and/or from different PRS beams may be multiplexed across symbols or slots.

In some examples, each symbol of the DL-PRS may be configured with a comb-structure in frequency, where the DL-PRS from a base station or a TRP may occupy every $N^{th}$ subcarrier. The comb value N may be configured to be 2, 4, 6, or 12. The length of the PRS within one slot may be a multiple of N symbols and the position of the first symbol within a slot may be flexible as long as the slot consists of at least N PRS symbols. The diagram 900A shows an example of a comb-6 DL-PRS configuration, where the pattern for the DL-PRS from different TRPs/base stations may be repeated after six (6) symbols.

FIG. 9B is a diagram 900B illustrating an example of UL-SRS transmitted from a UE in accordance with various aspects of the present disclosure. In one example, the UL-SRS from a UE may be configured with a comb-4 pattern, where the pattern for UL-SRS may be repeated after four (4) symbols. Similarly, the UL-SRS may be configured in an SRS resource of an SRS resource set, where each SRS resource may correspond to an SRS beam, and the SRS resource sets may correspond to a collection of SRS resources (e.g., beams) configured for a base station/TRP. In some examples, the SRS resources may span 1, 2, 4, 8, or 12 consecutive OFDM symbols. In other examples, the comb size for the UL-SRS may be configured to be 2, 4, or 8.

Figure 10:
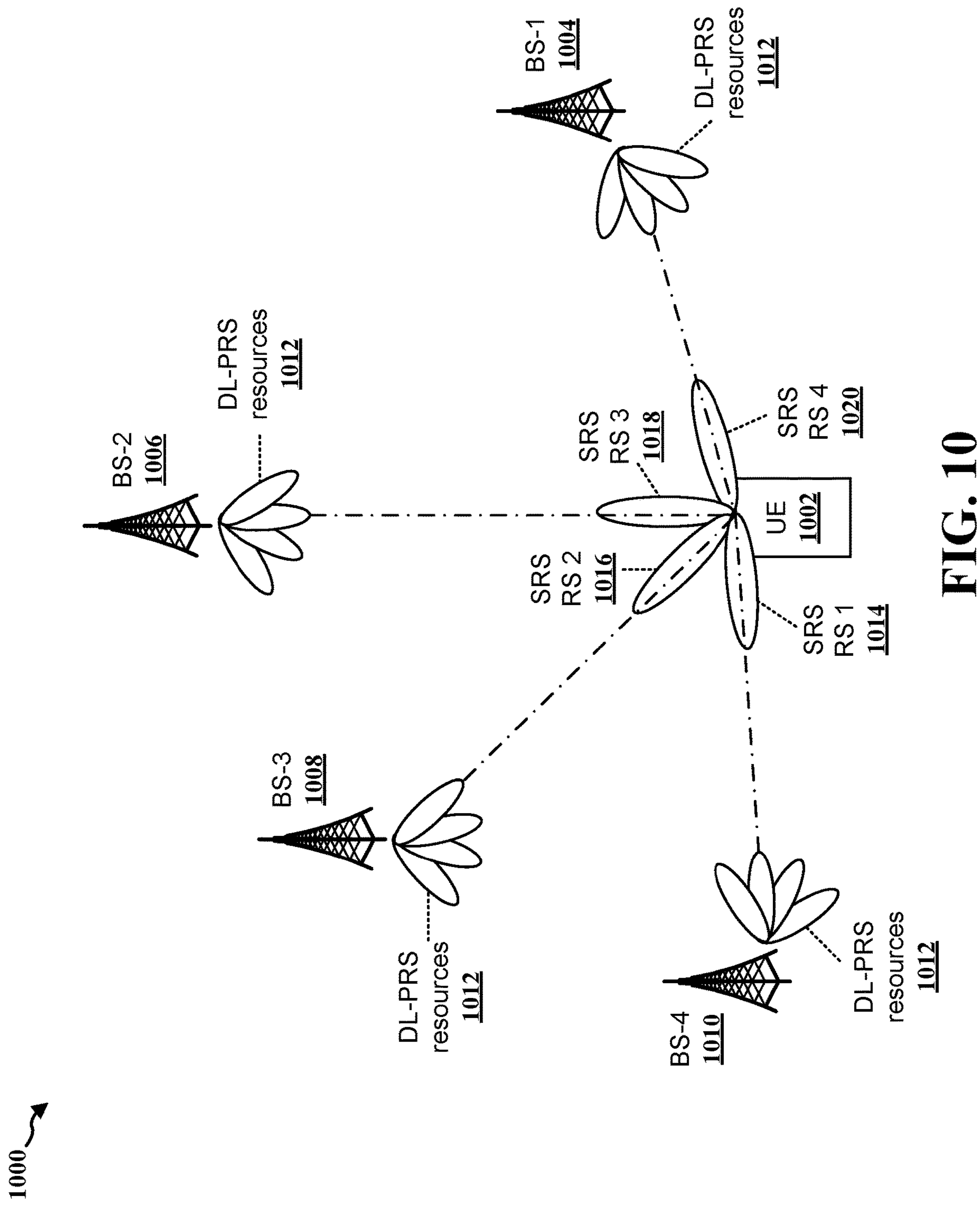
FIG. 10 is a diagram illustrating an example of estimating a UE's position based on multi-RTT measurements from multiple base stations or TRPs in accordance with various aspects of the present disclosure.

FIG. 10 is a diagram 1000 illustrating an example of estimating a UE's position based on multi-RTT measurements from multiple base stations or TRPs in accordance with various aspects of the present disclosure. A UE 1002 may be configured by a serving base station to decode DL-PRS resources 1012 that correspond to and are transmitted from a first base station (BS) 1004, a second BS 1006, a third BS 1008, and a fourth BS 1010. The UE 1002 may also be configured to transmit UL-SRSs on a set of UL-SRS resources, which may include a first SRS resource 1014, a second SRS resource 1016, a third SRS resource 1018, and a fourth SRS resource 1020, such that the serving cell(s), e.g., the first BS 1004, the second BS 1006, the third BS 1008, and the fourth BS 1010, and as well as other neighbor cell(s), may be able to measure the set of the UL-SRS resources transmitted from the UE 1002. For multi-RTT measurements based on DL-PRS and UL-SRS, as there may be an association between a UE's measurement for the DL-PRS and a base station's measurement for the UL-SRS, the smaller the gap is between the UE's DL-PRS measurement and the UE's UL-SRS transmission, the better the accuracy may be for estimating the position of the UE and/or the UE's distance with respect to each BS.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

In some examples, there may be measurement period specifications specified for PRS-RSTD, PRS-RSRP, and/or UE Rx-Tx time difference which may depend on various factors, such as a UE PRS processing capability and/or a number of samples, etc. In one example, a PRS-RSTD measurement period may be calculated based on the equation below (note similar equations may apply for PRS-RSRP and UE Rx-Tx time difference):

$$T_{RSTS,Total} = \sum_{i=1}^{L} T_{RSTD,i} + (L-1) * \max(T_{effect,i})$$

$$T_{RSTD,i} = \left(CSSF_{PRS,i} * N_{RxBeam,i} * \left\lceil \frac{N_{PRS,i}^{slot}}{N_i'} \right\rceil \left\lceil \frac{L_{available\_PRS,i}}{N_i} \right\rceil * N_{sample} - 1\right) * T_{effect,i} + T_{last}.$$

$$CSSF_{PRS,i} * N_{RxBeam,i} * \left\lceil \frac{N_{PRS,i}^{slot}}{N_i'} \right\rceil \left\lceil \frac{L_{available\_PRS,i}}{N_i} \right\rceil * N_{sample}$$

may correspond to a total number of samples that are to be measured, where a sample may correspond to all the PRS resources within an effective period, denoted as $T_{effect,i}$. Further, for the last sample the UE may utilize $T_{last}=T_i+T_{available\_PRS,i}$, where $T_i$ may correspond to a reported UE capability related to PRS processing.

In one example, $CSSF_{PRS,i}$ may be a factor that is used to control how a measurement gap (MG) is being shared between positioning and mobility (radio resource management (RRM)) measurements. If the factor is one (1), it may indicate that there is no sharing of the MG instances between the positioning and the RRM measurements. $N_{rxbeam}$ may be an Rx beam sweeping factor. In some examples, the $N_{rxbeam}$ may equal to eight (8) for FR2 and $N_{rxbeam}$ may equal to (1) for FR1. The factor of eight (8) in the above formulation may be based on a conservative assumption that a UE may perform up to eight Rx beam sweeps across eight "group of instances/samples" assuming the UE is keeping a constant Rx beam within each "group of instances/samples".

$$\left\lceil \frac{N_{PRS,i}^{slot}}{N_i'} \right\rceil \left\lceil \frac{L_{available\_PRS,i}}{N_i} \right\rceil$$

may be factors that consider the PRS processing UE capability with regards to a current PFL configuration. In one example, if the UE's capabilities are large enough, these factors may be one (1), and the factor may not contribute to the latency. $N_{sample}$ may be the number of samples/instances (e.g., for a PRS with periodicity of X ms, it may be assumed that at least $N_{sample}$ of periods are specified). $T_{effect,i}$ may correspond to an effective measurement periodicity (which is derived using the measurement gap repetition period (MGRP), $T_{PRS,i}$ and the UE's reported capability $T_i$). For example, $$T_{effect,i} = \left\lceil \frac{T_i}{T_{available\_PRS,i}} \right\rceil * T_{available\_PRS,i},$$

where $T_{available\_PRS,i}$=LCM($T_{PRS,i}$,$MGRP_i$), which may consider the alignment of the MG periodicity and the PRS periodicity. $T_{last}$ may be the measurement duration for the last PRS RSTD sample, which may include the sampling time and processing time, $T_{last}=T_i+T_{available\_PRS,i}$.

If a measurement gap for PRS measurements is configured for a UE, a UE DL PRS processing capability may be defined for the UE. In one example, for the purpose of DL PRS processing capability, a duration K microsecond (ms) of DL PRS symbols within a P ms window corresponding to a maximum PRS periodicity in a positioning frequency layer may be calculated by: (1) Type 1 duration calculation with UE symbol level buffering capability, $$K = \sum_{s\in S} K_s, \text{ and } K_s = T_s^{end} - T_s^{start};$$

(2) Type 2 duration calculation with UE slot level buffering capability, $$K = \frac{1}{2^{\mu}}|S|,$$

where S may be a set of slots based on the numerology of the DL PRS of a serving cell within the P ms window in the positioning frequency layer that contains potential DL PRS resources considering the actual nr-DL-PRS-ExpectedRSTD, nr-DL-PRS-ExpectedRSTD-Uncertainty provided for each pair of DL PRS resource sets.

In one example, for the Type 1 duration calculation, $$[T_s^{start}, T_s^{end}]$$

may be the smallest interval in ms within slot s corresponding to an integer number of OFDM symbols based on the numerology of the DL PRS of a serving cell that covers the union of the potential PRS symbols and determines the PRS symbol occupancy within slot s, where the interval $$[T_s^{start}, T_s^{end}]$$

may consider the actual nr-DL-PRS-ExpectedRSTD, nr-DL-PRS-ExpectedRSTD-Uncertainty provided for each pair of DL PRS resource sets (target and reference). In another example, for Type 2 duration calculation, u may be the numerology of the DL PRS, and |S| may be the cardinality of the set S.

In some examples, if a UE is performing PRS measurement(s) during an RRC inactive state (e.g., during an inactive state PRS measurement) or an RRC idle state, a serving base station may not configure PRS measurement gap(s) for the UE. For example, when a UE is an inactive state, the base station may consider or assume there is no data transmission at the UE. Thus, when the UE performs inter-frequency measurement (e.g., RRM measurement, PRS measurement, etc.) during the RRC inactive/idle state, the base station may not configure measurement gap(s) for the UE to interrupt data transmission. On the other hand, as described in connection with FIGS. 4 to 7, a UE may be configured to measure an initial BWP (e.g., the initial BWP 702), such as during a cell search and an initial access, while the UE is in an RRC inactive state an or RRC idle state. For example, when a UE performs cell search and initial access, the initial BWP may be configured for the UE to receive CORESET (e.g., CORESET #0), RMSI, and other messages. As such, in some examples, if a UE is configured to measure the PRS during an effective time of the initial BWP, the UE may not be able to determine whether to process PRS(s) outside the initial BWP and/or whether to process PRS(s) whose SCS may be different from the SCS of the initial BWP, etc. In another example, during an RRC inactive state or an RRC idle state, in addition to measuring the PRS, if the UE is also performing cell search and/or initial access related procedures, there may be a conflict or collision between the PRS and signals associated with the cell search and/or initial access related procedures. As no measurement gap may be configured for PRS measurement in the RRC inactive/idle state, if PRS and other DL signals (e.g., SSB, SIB1, CORESET0, MSG2/MsgB, paging, etc.) are in a same symbol and/or are close to each other in time, the UE may not know how to process the PRS and/or the UE may not know the priorities of how different signals are to be processed.

Aspects presented herein may enable a UE to determine how to prioritize processing of PRS and different DL channels (e.g., SSB, SIB1, CORESET0, MSG2/MsgB, paging, etc.) during an RRC inactive state or an RRC idle state if a time gap between the PRS and the DL channels is below a threshold, e.g., the PRS is close to the DL channels in time (but not overlapping). Aspects presented herein may enable a UE to determine how to process PRS and/or signals associated with an initial BWP if the UE is configured to measure the PRS during an effective time of the initial BWP and the UE is in an RRC inactive state or an RRC idle state.

In one aspect of the present disclosure, if a UE is in an RRC inactive state or in an RRC idle state and the UE also receives (or is configured to monitor) one or more PRSs and at least one DL channel, the UE may prioritize the processing of the one or more PRSs and the at least one DL channel when the one or more PRSs and the at least one DL channel are close in time. The at least one DL channel may include SSBs (e.g., PSS/SSS/PBCH), paging PDSCH, CORESET #0, RMSI, and/or positioning system information blocks (posSIBs), etc.

Figure 11:
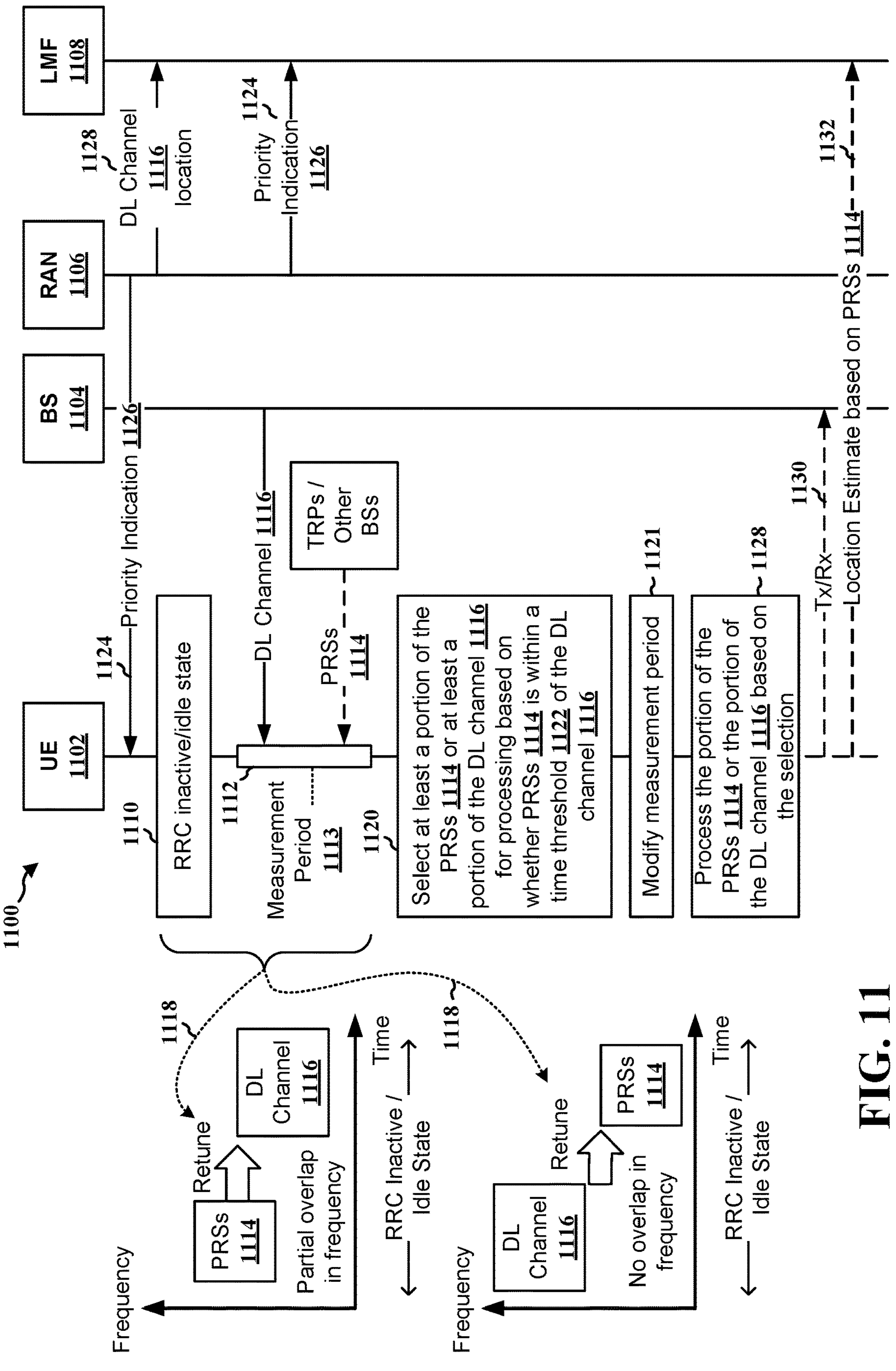
FIG. 11 is a communication flow illustrating an example of a UE prioritizing PRS and DL channels in an RRC inactive/idle state in accordance with various aspects of the present disclosure.

FIG. 11 is a communication flow 1100 illustrating an example of a UE prioritizing PRS and DL channels in an RRC inactive/idle state in accordance with various aspects of the present disclosure. The numberings associated with the communication flow 1100 do not specify a particular temporal order and are merely used as references for the communication flow 1100.

At 1110, a UE 1102 may be in an RRC inactive state or in an RRC idle state, such as described in connection with FIG. 5. For example, the UE 1102 may be just powered up, or may be transitioned into the RRC inactive/idle state from an RRC connected state after a period of inactivity, etc.

At 1112, the UE 1102 may be configured to monitor, receive, and/or measure one or more PRSs 1114 and at least one DL channel 1116 in a measurement period 1113. In one example, the at least one DL channel 1116 may be a broadcast channel or a multicast channel transmitted from a base station 1104. For example, the at least one DL channel 1116 may include one or more of a PSS/SSS/PBCH (e.g., received in SSB(s)), a PDSCH scrambled with a system information-radio network temporary identifier (SI-RNTI), a PDSCH scrambled with a paging-radio network temporary identifier (P-RNTI), one or more control resource set (CORESET) monitoring occasions (e.g., CORESET #0), one or more data channels associated with multicast or broadcast, one or more control channels associated with multicast or broadcast, and/or one or more reference signals configured for the UE to monitor during the RRC-inactive state or the RRC-idle state, etc. The UE 1102 may receive the one or more PRSs from one or more transmission and reception points (TRPs) and/or one or more base stations, which may be associated with a positioning session and/or a location management function (LMF) 1108.

In some scenarios, when the UE 1102 is in an RRC inactive/idle state, the UE 1102 may still be configured to monitor and/or receive the one or more PRSs 1114 and the at least one DL channel 1116. The one or more PRSs 1114 and the at least one DL channel 1116 may have different bandwidths, which may have at least a partial overlap or no overlap at all in frequency, such as shown at 1118. As such, the UE 1102 may be specified to perform a retune if the UE 1102 is to measure both the one or more PRSs 1114 and the at least one DL channel 1116. For example, the UE 1102 may apply a first configuration (e.g., using a first beam) for receiving/monitoring the one or more PRSs 1114. Then, the UE 1102 may perform a retune and apply a second configuration (e.g., using a second beam) for receiving/monitoring the at least one DL channel 1116. As such, if the one or more PRSs 1114 and the at least one DL channel 1116 are too close in time, the UE 1102 may not have a sufficient time to perform or complete the retune.

In one aspect of the present disclosure, a UE (e.g., the UE 1102) may be configured to apply or follow one or more rules that define a "soft collision" and/or a priority of reception when PRS (e.g., the one or more PRSs 1114) and other DL signal(s)/channel(s) (e.g., the at least one DL channel 1116) are being configured close in time (but not colliding or overlapping), such as shown at 1118. For purposes of the present disclosure, a "soft collision" and a "soft collide" may refer to one or more PRSs that are scheduled within a time threshold (e.g., are close in time) of one or more DL signals/channels, but the one or more PRSs may not overlap with the one or more DL signals/channels. In other words, a soft collision may occur if the time gap between the PRS (or at least one symbol occupied by the PRS) and the DL signal/channel is below a time threshold.

In one aspect, at 1120, if occupied symbols or potentially occupied symbols of the one or more PRSs 1114 is within a time threshold 1122 (which may be in microsecond, nanosecond, or symbols) of the at least one DL channel 1116, the UE 1102 may be configured to either measure/process at least some portion of the one or more PRSs 1114 or at least some portion of the at least one DL channel 1116. In other words, if occupied symbols or potentially occupied symbols of the one or more PRSs 1114 soft collide with the at least one DL channel 1116, the UE 1102 may apply a prioritization rule that defines whether the UE 1102 is to process the one or more PRSs 1114 or the at least one DL channel 1116. In one example, as shown by a diagram 1200A in FIG. 12A, if the one or more PRSs 1114 or at least one symbol of the one or more PRSs 1114 is within the time threshold 1122 of the at least one DL channel 1116, the UE 1102 may be configured to process/measure the one or more PRSs 1114 and skip/drop processing/measuring the at least one DL channel 1116, or the UE 1102 may be configured to process/measure the at least one DL channel 1116 and skip/drop processing/measuring the one or more PRSs 1114.

Figure 12B:
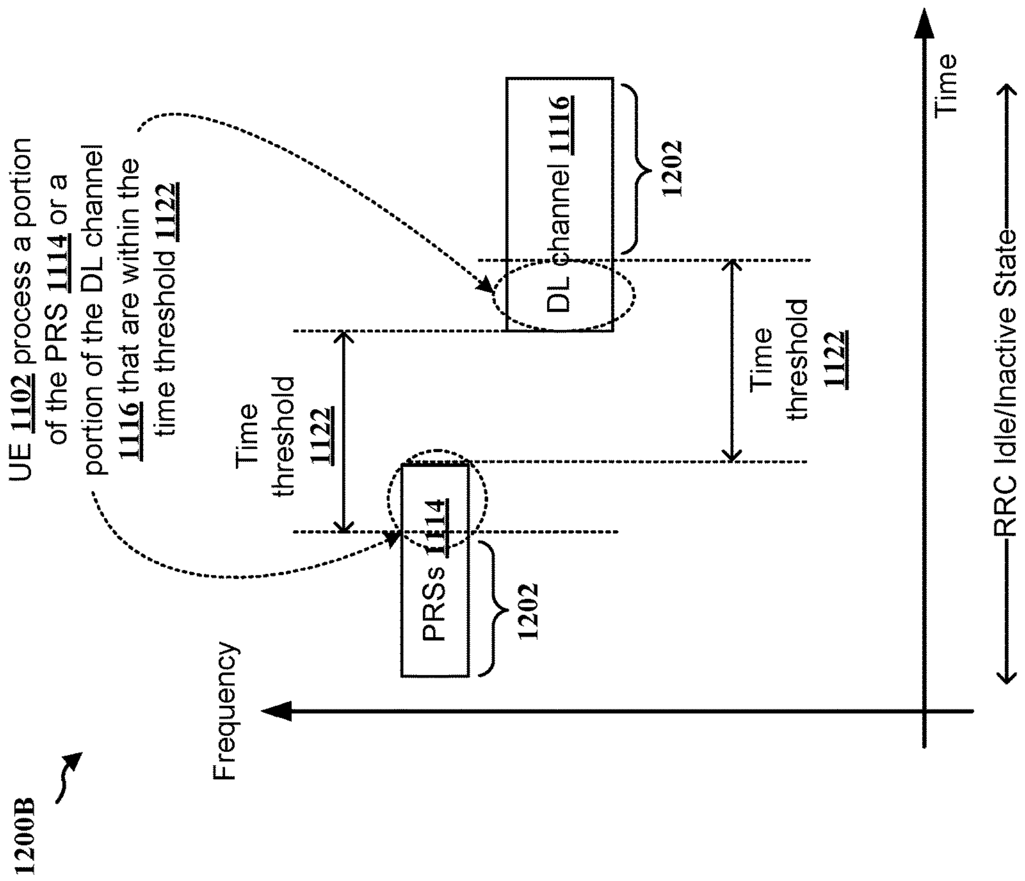
FIG. 12B is a diagram illustrating an example of a UE prioritizing PRS and DL channel in accordance with various aspects of the present disclosure.

In another example, as shown by a diagram 1200B in FIG. 12B, if the one or more PRSs 1114 or at least one symbol of the one or more PRSs 1114 are within the time threshold 1122 of the at least one DL channel 1116, the UE 1102 may be configured to process/measure a portion of the one or more PRSs 1114 that is within the time threshold 1122 and skip/drop processing/measuring the portion of the at least one DL channel 1116 that is within the time threshold 1122, or the UE 1102 may be configured to process/measure a portion of at least one DL channel 1116 that is within the time threshold 1122 and skip/drop processing/measuring the portion of the one or more PRSs 1114 that is within the time threshold 1122. The UE 1102 may process/measure portions of the one or more PRSs 1114 and the at least one DL channel 1116 that are not within the time threshold 1122, such as shown at 1202 (e.g., their measurements/processes remain unaffected).

In one aspect, referring back to FIG. 11, at 1121, if occupied symbols or potentially occupied symbols of the one or more PRSs 1114 is within a time threshold 1122 of the at least one DL channel 1116, the UE 1102 may further be configured to modify the measurement period 1113. For example, the UE 1102 may adjust the measuring period "carrier-specific scaling factor (CSSF)" factor (e.g., the $CSSF_{PRS,i}$ factor) to enable a longer measurement period 1113 and time-share between the one or more PRSs 1114 and at least one DL channel 1116. In other words, a longer measurement period may be configured when soft collision happens between the one or more PRSs 1114 and the at least one DL channel 1116.

For purposes of the present disclosure, the one or more PRSs 1114 may correspond to an individual PRS resource, at least one PRS resource of a PRS resource set, and/or at least one PRS resource of a PFL, etc. The "occupied symbol" or the "potentially occupied symbols" of the one or more PRSs 1114 may correspond to a range of symbols in which the UE 1102 and/or the base station 1104 may assume is to be used for PRS. In one example, the "occupied symbol" or the "potentially occupied symbols" of the one or more PRSs 1114 may be determined/calculated based on PRS symbols configured for the UE 1102 together with a downlink PRS expected reference signal time difference (RSTD) parameter (e.g., nr-DL-PRS-ExpectedRSTD) and a downlink PRS expected RSTD uncertainty parameter (e.g., nr-DL-PRS-ExpectedRSTD-Uncertainty). In one example, the nr-DL-PRS-ExpectedRSTD parameter may indicate an RSTD value that a target device is expected to measure between a TRP and an assistance data reference TRP. The nr-DL-PRS-ExpectedRSTD field may take into account the expected propagation time difference as well as transmit time difference of PRS positioning occasions between the two TRPs. In some examples, the resolution may $4\times T_s$, with $T_s=1/(15000*2048)$ seconds. In other words, the "occupied symbol" or the "potentially occupied symbols" of the one or more PRSs 1114 may be based on the PRS symbols configured to the UE 1102 and also based on an uncertainty window. For example, the UE 1102 may be configured with a PRS with two symbols, but an uncertainty window associated with the PRS may indicate a plus one/minus one symbol uncertainty window (e.g., ±1 symbol). As such, the "occupied symbol" or the "potentially occupied symbols" of the one or more PRSs 1114 may be three or four symbols.

For example, a UE capable of performing positioning measurements, including RSTD, PRS-RSRP (e.g., measurement of RSRP for PRS), and/or UE Rx-Tx time difference, in an RRC inactive state, may be configured to follow a set of rules that are applicable to PRS resources that collide with other DL signals/channels which include SSB, SIB1, CORESET0, MSG2/MsgB, paging and DL SDT. In one example, the set of rules may define that if a PRS resource is within the initial DL BWP, a PRS resource instance collides with another DL signal/channel if any portion of the other DL signal/channel overlaps in time with the PRS instance, taking into account nr-DL-PRS-ExpectedRSTD-Uncertainty and nr-DL-PRS-ExpectedRSTD. On the other hand, if a PRS resource is outside the initial DL BWP, a PRS resource instance collides with another DL signals/channels if any portion of the other DL signal/channel overlaps with the time interval starting X symbols before the PRS instance and ending X symbols after the PRS instance, taking into account nr-DL-PRS-ExpectedRSTD-Uncertainty and nr-DL-PRS-ExpectedRSTD. In one example, the value for X may be determined based on Table 2 below.

TABLE 1

Example value of X number of symbols

| FR | μ | NR Slot length (ms) | X symbols |
|---|---|---|---|
| FR1 | 0 | 1 | 7 |
| | 1 | 0.5 | 14 |
| | 2 | 0.25 | 28 |
| FR2 | 2 | 0.25 | 14 |
| | 3 | 0.125 | 28 |

Note:
The FR1 value applies if one or both of the serving cell and the positioning frequency layer are in FR1. FR2 value applies both of the serving cell and the positioning frequency layer are in FR2.

In some examples, a UE may not be specified to perform additional SSB measurement for the SSB configured as quasi-co-located (QCL) source of PRS resources. In another example, when a UE is configured with measurement for more than one positioning requests, the measurement period for each request may be longer than measurement period when UE is configured with measurement for single positioning request.

As discussed in connection with 1112 of FIG. 11, the at least one DL channel 1116 may correspond to one or more of SSB(s) (e.g., PSS, SSS, PBCH), a PDSCH scrambled with SI-RNTI, a PDSCH scrambled with P-RNTI, CORESET monitoring occasion(s), CORESET #0, data/control channels of multicast and broadcast, and/or reference signal(s) (e.g., CSI-RS) configured for the UE to monitor during an RRC inactive/Idle state, e.g., for mobility purposes. In some examples, the prioritization between the one or more PRSs 1114 and the at least one DL channel 1116 may further depend on the type of the at least one DL channel 1116. In other words, for different PRS-DL-channel, different prioritization may be applied. For example, a PDSCH scrambled with P-RNTI may be configured to have a higher priority than PRS, and the PRS may be configured to have a higher priority than SSBs (e.g., PDSCH scrambled with P-RNTI>PRS>SSBs). As such, if the UE 1102 is configured to receive a PRS that is within the time threshold 1122 of a PDSCH scrambled with P-RNTI, the UE 1102 may process the PDSCH scrambled with P-RNTI or at least a portion of the PDSCH scrambled with P-RNTI, and may drop/skip the processing for the PRS or at least a portion of the PRS. On the other hand, if the UE 1102 is configured to receive a PRS that is within the time threshold 1122 of SSBs, the UE 1102 may process the PRS or at least a portion of the PRS, and may drop/skip the processing for the SSBs or at least a portion of the SSBs.

In one example, as shown at 1124, a random access network (RAN) 1106 (or a node of the RAN, or the base station 1104) may transmit a priority indication 1126 to the LMF 1108 (which may be associated with configuring the one or more PRSs 1114 for the UE 1102 or performing the positioning session with the UE 1102) and/or to the UE 1102, where the priority indication 1126 may indicate how a UE is to prioritize the one or more PRSs 1114 and the at least one DL channel 1116 (e.g., PDSCH scrambled with P-RNTI>PRS>SSBs). In other words, the RAN 1106 may inform the LMF 1108 of which channels are considered or may be considered as higher priority compared to the PRS. After the LMF 1108 receives this information, the LMF may use this information to determine where and/or what PRS(s) to schedule for the UE 1102, and the LMF 1108 may try to avoid the soft-collision if possible. In some examples, as shown at 1128, the RAN 1106 may also inform the LMF 1108 on location(s) of the at least one DL channel 1116. Thus, after the LMF 1108 receives this information, the LMF 1108 may use the location of the at least one DL channel 1116 to determine where and/or what PRS to schedule for the UE 1102, and the LMF 1108 may try to avoid the soft-collision if possible. Similarly, the RAN 1106 may inform the UE 1102 of which channels are considered and/or should be considered as higher priority compared to the PRS via the priority indication 1126, such that the UE 1102 may apply the priority rule(s) in the priority indication 1126.

In another aspect of the present disclosure, the value of the time threshold 1122 may be configured to depend on the frequency range (FR) and/or the bandwidth. For example, the time threshold 1122 may be a first value (e.g., 0.5 ms) when the UE 1102 is communicating (e.g., receiving the at least one DL channel 1116 and/or the one or more PRSs 1114) under a first frequency range (e.g., FR1), and the time threshold 1122 may be a second value (e.g., 0.25 ms) when the UE 1102 is communicating (e.g., receiving the at least one DL channel 1116 and/or the one or more PRSs 1114) under a second frequency range (e.g., FR2), etc.

In another examples, the value of the time threshold 1122 may be configured to depend on the UE 1102's UE capability. For example, the time threshold 1122 may be a first value (e.g., a smaller value) for a UE with a higher UE capability, and the time threshold 1122 may be a second value (e.g., a larger value) for a UE with a lower UE capability, etc.

In another aspect of the present disclosure, if the UE 1102 is configured or specified to perform one or more low-latency positioning measurements in an RRC inactive state or in an RRC idle state, the UE 1102 may be configured to give priority to the PRS measurement(s) (e.g., prioritize processing of the one or more PRSs 1114) even in the instances that the measurement(s) may soft collide with the other RRC-inactive channels. In other words, if the UE 1102 is configured to perform a low-latency positioning measurement, the UE may process the one or more PRSs 1114 regardless of whether the one or more PRSs 1114 or any symbols of the one or more PRSs 1114 is within the time threshold 1122 of the at least one DL channel 1116. For purposes of the present disclosure, a "low-latency positioning measurement" may be associated with a latency QoS, and/or a response-time, etc. The QoS may be an information element (IE) that indicates the quality of service and includes a number of sub-fields. In the case of measurements, some of the sub-fields may apply to the location estimate that could be obtained by the server from the measurements provided by the target device assuming that the measurements are the sources of error. For example, the sub-fields may include a horizontalAccuracy field that indicates a maximum horizontal error in the location estimate at an indicated confidence level; a verticalCoordinateRequest field that indicates whether a vertical coordinate is utilized (TRUE) or not (FALSE), and/or a verticalAccuracy field that indicates a maximum vertical error in the location estimate at an indicated confidence level and may be applicable when a vertical coordinate is requested. The response-time may indicate a maximum response time as measured between receipt of the RequestLocationInformation and transmission of a ProvideLocationInformation. If the unit field is absent, this may be given as an integer number of seconds between 1 and 128. If the unit field is present, the maximum response time may be given in units of 10-seconds, between 10 and 1280 seconds. If the periodicalReporting IE is included in CommonIEsRequestLocationInformation, this field may not be included by the location server and may be ignored by a target device (if included).

In another aspect of the present disclosure, the UE 1102 may be configured with a maximum number of times in which the UE 1102 may skip/drop processing the PRSs and/or the DL channel(s) when the PRSs are within the time threshold 1122 of the DL channel(s). In other words, the UE 1102 may be configured with a maximum number of "missed instances" due to soft collision between the PRSs and the DL channel(s). For example, the UE 1102 may be configured not to skip processing a paging PDSCH for more than a defined number of monitoring occasions (e.g., three times), or not to skip processing PRS for more than a defined number of monitoring occasions, etc. If the maximum number of "missed instances" is reached for the PRSs or the DL channel(s), the UE 1102 may process the PRS or the DL channel regardless of whether the PRS or any symbols of the PRS is within the time threshold 1122 of the DL channel.

In another aspect of the present disclosure, if one of the resources of a PFL associated with the one or more PRSs 1114, or one of the symbols of a resource, or one of the resources of a set, are in a "soft collision" regime with the at least one DL channel 1116, for the purposes of measurement period formulation (e.g., the measurement period 1113), the UE 1102 may be configured to assume that all resources of the PFL are affected and the measurement period may be increased. Alternatively, or additionally, if one of the resources of the PFL associated with the one or more PRSs 1114, or one of the symbols of a resource, or one of the resources of a set, are in a "soft collision" regime with another channel, for the purposes of measurement period formulation, it may be assumed that the soft-colliding symbol/resource/set's processing is affected, but the remaining may be measured as usual (e.g., similar to what is described in FIGS. 12A and 12B). In some examples, the affected processing may include positioning accuracy lowered or not guaranteed, lower accuracy expected, and/or measurement period of those resources/sets increased, etc.

At 1128, the UE 1102 may process the portion of the PRSs 1114 or the portion of the DL channel 1116 based on the selection (e.g., at 1120). For example, as shown at 1130, if the UE 1102 selects to process the at least one DL channel 1116 or at least a portion of the at least one DL channel 1116, the UE 1102 may communicate with the base station 1104 based at least in part on the at least one DL channel 1116 (e.g., by decoding information in the at least one DL channel 1116). In another example, as shown at 1132, if the UE 1102 selects to process the one or more PRSs 1114 or at least a portion of the one or more PRSs 1114, the UE 1102 may transmit measurement, location estimate, and/or report associated with positioning to the LMF 1108 (e.g., the RTT, Tx/Rx time difference, etc.).

FIG. 13 is a flowchart 1300 of a method of wireless communication. The method may be performed by a UE or a component of a UE (e.g., the UE 104, 350, 402, 804, 1002, 1102; the apparatus 1502; a processing system, which may include the memory 360 and which may be the entire UE 350 or a component of the UE 350, such as the TX processor 368, the RX processor 356, and/or the controller/processor 359). The method may enable the UE to prioritize PRS and/or one or more DL channels if the UE is configured to measure the PRS that are close in time with the one or more channels and the UE is in an RRC inactive state or an RRC idle state.

At 1302, the UE may receive, from a RAN node, an indication of a priority associated with the one or more PRSs and the at least one DL channel, where the UE may select at least some portion of the one or more PRSs or the at least some portion of the at least one DL channel for processing based on the indication, such as described in connection with FIG. 11. For example, at 1124, the UE 1102 may receive a priority indication 1126 from the RAN 1106, where the priority indication 1126 may indicate to the UE 1102 how PRS and different DL channels are to be prioritized if the PRS and the different DL channels are within the time threshold 1122 from each other. The reception of the indication of a priority associated with one or more PRSs and at least one DL channel may be performed by, e.g., the priority indication process component 1540 and/or the reception component 1530 of the apparatus 1502 in FIG. 15.

At 1304, the UE may receive one or more PRSs and at least one DL channel in a measurement period and during an RRC-inactive state or an RRC-idle state, the one or more PRSs may occupy a range of symbols that do not overlap with the at least one DL channel in time, such as described in connection with FIG. 11. For example, at 1110 and 1112, the UE 1102 may receive one or more PRSs 1114 and at least one DL channel 1116 within a measurement period 1113 during an RRC-inactive state or an RRC-idle state. The reception of the one or more PRSs and the at least one DL channel may be performed by, e.g., the PRS/DL channel monitor component 1542 and/or the reception component 1530 of the apparatus 1502 in FIG. 15. In some examples, a bandwidth of the one or more PRSs may be different than a bandwidth associated with the at least one DL channel. The bandwidth of the one or more PRSs may at least partially overlap with the bandwidth of the at least one DL channel, or there may be no overlap between the two bandwidths.

In one example, the one or more PRSs may correspond to an individual PRS resource, at least one PRS resource of a PRS resource set, or at least one PRS resource of a PFL.

In another example, the range of symbols may be based on a number of PRS symbols configured for the UE and an uncertainty window, where the uncertainty window may be associated with a downlink PRS expected RSTD parameter (nr-DL-PRS-ExpectedRSTD) and a downlink PRS expected RSTD uncertainty parameter (nr-DL-PRS-ExpectedRSTD-Uncertainty).

In another example, the at least one DL channel may include one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state. In such an example, the UE may select the at least some portion of the one or more PRSs or the at least some portion of the at least one DL channel for processing based on a type of the at least one DL channel.

At 1306, the UE may select at least some portion of the one or more PRSs or at least some portion of the at least one DL channel for processing based on whether the range of symbols is within a time threshold of the at least one DL channel, such as described in connection with FIG. 11. For example, at 1120, the UE 1102 may select at least a portion of the PRSs 1114 or at least a portion of the DL channel 1116 for processing based on whether PRSs 1114 is within a time threshold 1122 of the DL channel 1116. The selection may be performed by, e.g., the PRS/DL channel prioritization component 1544 of the apparatus 1502 in FIG. 15.

In one example, the at least some portion of the one or more PRSs may be selected for processing if the UE is configured to perform a low-latency positioning measurement regardless of whether the range of symbols is within the time threshold of the at least one DL channel.

In another example, the at least some portion of the one or more PRSs may be selected for processing if the range of symbols is within the time threshold of the at least one DL channel, and processing for the at least some portion of the at least one DL channel may be skipped. Alternatively, the at least some portion of the at least one DL channel may be selected for processing if the range of symbols is within the time threshold of the at least one DL channel, and processing for the at least some portion of the one or more PRSs may be skipped.

In another example, the at least some portion of the one or more PRSs may be selected for processing if the UE has skipped processing previous PRSs for a defined number of times regardless of whether the range of symbols is within the time threshold of the at least one DL channel. Similarly, the at least some portion of the at least one DL channel may be selected for processing if the UE has skipped processing previous DL channels for a defined number of times regardless of whether the range of symbols is within the time threshold of the at least one DL channel.

In another example, a value of the time threshold may be based on a frequency range or a bandwidth used for receiving the one or more PRSs or the at least one DL channel. In another example, a value of the time threshold is based on a UE capability associated with the UE.

Figure 12A:
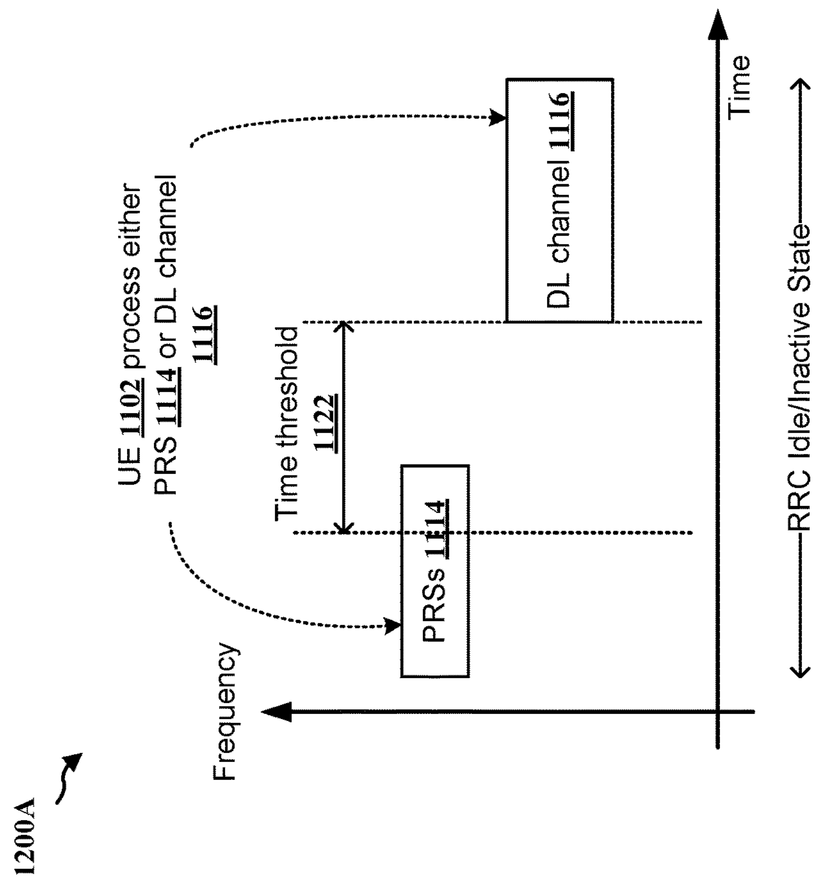
FIG. 12A is a diagram illustrating an example of a UE prioritizing PRS and DL channel in accordance with various aspects of the present disclosure.

In another example, the at least some portion of the one or more PRSs may be selected for processing if at least a portion of the range of symbols is within the time threshold of the at least one DL channel, and the UE may also increase the measurement period, such as described in connection with FIG. 12A. Similarly, the at least some portion of the at least one DL channel may be selected for processing if at least a portion of the range of symbols is within the time threshold of the at least one DL channel, and the UE may also increase the measurement period, such as described in connection with FIG. 12A.

In another example, the at least some portion of the one or more PRSs may be selected for processing if a portion of the range of symbols is within the time threshold of the at least one DL channel, where the portion of the range of symbols may correspond to the at least some portion of the one or more PRSs, such as described in connection with FIG. 12B. Similarly, the at least some portion of the at least one DL channel may be selected for processing if a portion of the range of symbols is within the time threshold of the at least some portion of the at least one DL channel, such as described in connection with FIG. 12B.

At 1308, the UE may adjust a measurement period factor to increase the measurement period based on whether the range of symbols is within the time threshold of the at least one DL channel, such as described in connection with FIG. 11. For example, at 1121, the UE 1102 may modify the measurement period based on whether PRSs 1114 is within a time threshold 1122 of the DL channel 1116. The adjustment of the measurement period factor may be performed by, e.g., the measurement period adjustment component 1546 of the apparatus 1502 in FIG. 15.

At 1310, the UE may process, based on the selection, the at least some portion of the one or more PRSs or the at least some portion of the at least one DL channel, such as described in connection with FIG. 11. For example, at 1128, the UE 1102 may process the portion of the PRSs 1114 or the portion of the DL channel 1116 based on the selection. The processing of the at least some portion of the one or more PRSs or the at least some portion of the at least one DL channel may be performed by, e.g., the PRS/DL channel process component 1548 of the apparatus 1502 in FIG. 15.

At 1312, the UE may report a location estimate based on the one or more PRSs or communicate via the at least one DL channel, such as described in connection with FIG. 11. For example, at 1130, the UE 1102 communicate with the base station 1104 based on the processed at least one DL channel 1116, or at 1132, the UE 1102 may transmit a location estimate to the LMF 1108 based on the processed one or more PRSs 1114. The reporting or the communication may be performed by, e.g., the PRS/DL channel communication component 1550, the reception component 1530, and/or the transmission component 1534 of the apparatus 1502 in FIG. 15.

Figure 14:
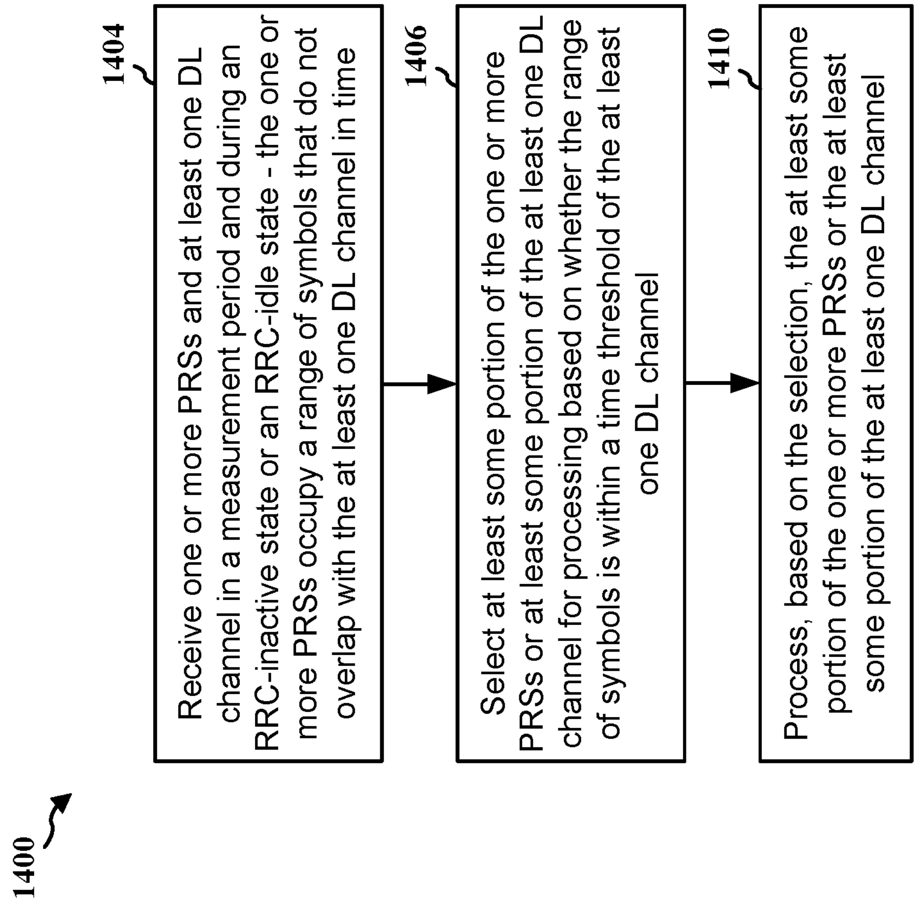
FIG. 14 is a flowchart of a method of wireless communication in accordance with aspects presented herein.

FIG. 14 is a flowchart 1400 of a method of wireless communication. The method may be performed by a UE or a component of a UE (e.g., the UE 104, 350, 402, 804, 1002, 1102; the apparatus 1502; a processing system, which may include the memory 360 and which may be the entire UE 350 or a component of the UE 350, such as the TX processor 368, the RX processor 356, and/or the controller/processor 359). The method may enable the UE to prioritize PRS and/or one or more DL channels if the UE is configured to measure the PRS that are close in time with the one or more channels and the UE is in an RRC inactive state or an RRC idle state.

In one example, the UE may receive, from a RAN node, an indication of a priority associated with the one or more PRSs and the at least one DL channel, where the UE may select at least some portion of the one or more PRSs or the at least some portion of the at least one DL channel for processing based on the indication, such as described in connection with FIG. 11. For example, at 1124, the UE 1102 may receive a priority indication 1126 from the RAN 1106, where the priority indication 1126 may indicate to the UE 1102 how PRS and different DL channels are to be prioritized if the PRS and the different DL channels are within the time threshold 1122 from each other. The reception of the indication of a priority associated with one or more PRSs and at least one DL channel may be performed by, e.g., the priority indication process component 1540 and/or the reception component 1530 of the apparatus 1502 in FIG. 15.

At 1404, the UE may receive one or more PRSs and at least one DL channel in a measurement period and during an RRC-inactive state or an RRC-idle state, the one or more PRSs may occupy a range of symbols that do not overlap with the at least one DL channel in time, such as described in connection with FIG. 11. For example, at 1110 and 1112, the UE 1102 may receive one or more PRSs 1114 and at least one DL channel 1116 within a measurement period 1113 during an RRC-inactive state or an RRC-idle state. The reception of the one or more PRSs and the at least one DL channel may be performed by, e.g., the PRS/DL channel monitor component 1542 and/or the reception component 1530 of the apparatus 1502 in FIG. 15. In some examples, a bandwidth of the one or more PRSs may be different than a bandwidth associated with the at least one DL channel.

In one example, the one or more PRSs may correspond to an individual PRS resource, at least one PRS resource of a PRS resource set, or at least one PRS resource of a PFL.

In another example, the range of symbols may be based on a number of PRS symbols configured for the UE and an uncertainty window, where the uncertainty window may be associated with a downlink PRS expected RSTD parameter (nr-DL-PRS-ExpectedRSTD) and a downlink PRS expected RSTD uncertainty parameter (nr-DL-PRS-ExpectedRSTD-Uncertainty).

In another example, the at least one DL channel may include one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state. In such an example, the UE may select the at least some portion of the one or more PRSs or the at least some portion of the at least one DL channel for processing based on a type of the at least one DL channel.

At 1406, the UE may select at least some portion of the one or more PRSs or at least some portion of the at least one DL channel for processing based on whether the range of symbols is within a time threshold of the at least one DL channel, such as described in connection with FIG. 11. For example, at 1120, the UE 1102 may select at least a portion of the PRSs 1114 or at least a portion of the DL channel 1116 for processing based on whether PRSs 1114 is within a time threshold 1122 of the DL channel 1116. The selection may be performed by, e.g., the PRS/DL channel prioritization component 1544 of the apparatus 1502 in FIG. 15.

In one example, the at least some portion of the one or more PRSs may be selected for processing if the UE is configured to perform a low-latency positioning measurement regardless of whether the range of symbols is within the time threshold of the at least one DL channel.

In another example, the at least some portion of the one or more PRSs may be selected for processing if the range of symbols is within the time threshold of the at least one DL channel, and processing for the at least some portion of the at least one DL channel may be skipped. Alternatively, the at least some portion of the at least one DL channel may be selected for processing if the range of symbols is within the time threshold of the at least one DL channel, and processing for the at least some portion of the one or more PRSs may be skipped.

In another example, the at least some portion of the one or more PRSs may be selected for processing if the UE has skipped processing previous PRSs for a defined number of times regardless of whether the range of symbols is within the time threshold of the at least one DL channel. Similarly, the at least some portion of the at least one DL channel may be selected for processing if the UE has skipped processing previous DL channels for a defined number of times regardless of whether the range of symbols is within the time threshold of the at least one DL channel.

In another example, a value of the time threshold may be based on a frequency range or a bandwidth used for receiving the one or more PRSs or the at least one DL channel. In another example, a value of the time threshold is based on a UE capability associated with the UE.

In another example, the at least some portion of the one or more PRSs may be selected for processing if at least a portion of the range of symbols is within the time threshold of the at least one DL channel, and the UE may also increase the measurement period, such as described in connection with FIG. 12A. Similarly, the at least some portion of the at least one DL channel may be selected for processing if at least a portion of the range of symbols is within the time threshold of the at least one DL channel, and the UE may also increase the measurement period, such as described in connection with FIG. 12A.

In another example, the at least some portion of the one or more PRSs may be selected for processing if a portion of the range of symbols is within the time threshold of the at least one DL channel, where the portion of the range of symbols may correspond to the at least some portion of the one or more PRSs, such as described in connection with FIG. 12B. Similarly, the at least some portion of the at least one DL channel may be selected for processing if a portion of the range of symbols is within the time threshold of the at least some portion of the at least one DL channel, such as described in connection with FIG. 12B.

In another example, the UE may adjust a measurement period factor to increase the measurement period based on whether the range of symbols is within the time threshold of the at least one DL channel, such as described in connection with FIG. 11. For example, at 1121, the UE 1102 may modify the measurement period based on whether PRSs 1114 is within a time threshold 1122 of the DL channel 1116. The adjustment of the measurement period factor may be performed by, e.g., the measurement period adjustment component 1546 of the apparatus 1502 in FIG. 15.

At 1410, the UE may process, based on the selection, the at least some portion of the one or more PRSs or the at least some portion of the at least one DL channel, such as described in connection with FIG. 11. For example, at 1128, the UE 1102 may process the portion of the PRSs 1114 or the portion of the DL channel 1116 based on the selection. The processing of the at least some portion of the one or more PRSs or the at least some portion of the at least one DL channel may be performed by, e.g., the PRS/DL channel process component 1548 of the apparatus 1502 in FIG. 15.

In one example, the UE may report a location estimate based on the one or more PRSs or communicate via the at least one DL channel, such as described in connection with FIG. 11. For example, at 1130, the UE 1102 communicate with the base station 1104 based on the processed at least one DL channel 1116, or at 1132, the UE 1102 may transmit a location estimate to the LMF 1108 based on the processed one or more PRSs 1114. The reporting or the communication may be performed by, e.g., the PRS/DL channel communication component 1550, the reception component 1530, and/or the transmission component 1534 of the apparatus 1502 in FIG. 15.

Figure 15:
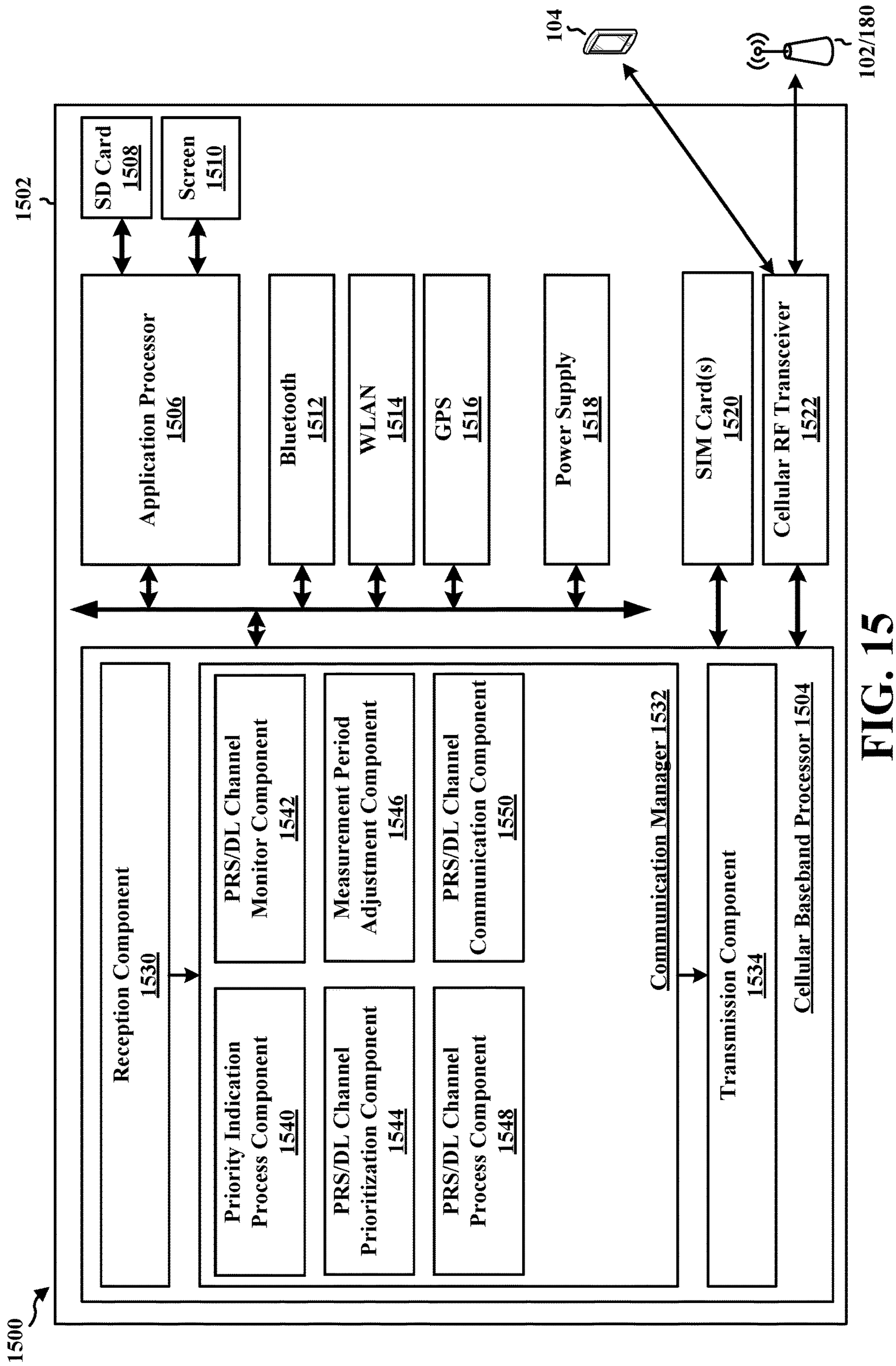
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a priority indication process component 1540 that is configured to receive, from a RAN node, an indication of a priority associated with the one or more PRSs and the at least one DL channel, e.g., as described in connection with 1302 of FIG. 13. The communication manager 1532 further includes a PRS/DL channel monitor component 1542 that is configured to receive one or more PRSs and at least one DL channel in a measurement period and during an RRC-inactive state or an RRC-idle state, the one or more PRSs occupying a range of symbols that do not overlap with the at least one DL channel in time, e.g., as described in connection with 1304 of FIGS. 13 and/or 1404 of FIG. 14. The communication manager 1532 further includes a PRS/DL channel prioritization component 1544 that is configured to select at least some portion of the one or more PRSs or at least some portion of the at least one DL channel for processing based on whether the range of symbols is within a time threshold of the at least one DL channel, e.g., as described in connection with 1306 of FIGS. 13 and/or 1406 of FIG. 14. The communication manager 1532 further includes a measurement period adjustment component 1546 that is configured to adjust a measurement period factor to increase the measurement period based on whether the range of symbols is within the time threshold of the at least one DL channel, e.g., as described in connection with 1308 of FIG. 13. The communication manager 1532 further includes a PRS/DL channel process component 1548 that is configured to process, based on the selection, the at least some portion of the one or more PRSs or the at least some portion of the at least one DL channel, e.g., as described in connection with 1310 of FIGS. 13 and/or 1410 of FIG. 14. The communication manager 1532 further includes a PRS/DL channel communication component 1550 that is configured to report a location estimate based on the one or more PRSs or communicate via the at least one DL channel, e.g., as described in connection with 1312 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving one or more PRSs and at least one DL channel in a measurement period and during an RRC-inactive state or an RRC-idle state, the one or more PRSs occupying a range of symbols that do not overlap with the at least one DL channel in time (e.g., the PRS/DL channel monitor component 1542 and/or the reception component 1530). The apparatus 1502 may further include means for selecting at least some portion of the one or more PRSs or at least some portion of the at least one DL channel for processing based on whether the range of symbols is within a time threshold of the at least one DL channel (e.g., the PRS/DL channel prioritization component 1544). The apparatus 1502 may further include means for processing, based on the selection, the at least some portion of the one or more PRSs or the at least some portion of the at least one DL channel (e.g., the PRS/DL channel process component 1548).

In one configuration, the apparatus 1502 may further include means for receiving, from a RAN node, an indication of a priority associated with the one or more PRSs and the at least one DL channel (e.g., the priority indication process component 1540 and/or the reception component 1530).

In another configuration, the apparatus 1502 may further include means for adjusting a measurement period factor to increase the measurement period based on whether the range of symbols is within the time threshold of the at least one DL channel (e.g., the measurement period adjustment component 1546).

In another configuration, the apparatus 1502 may further include means for reporting a location estimate based on the one or more PRSs or communicate via the at least one DL channel (e.g., the PRS/DL channel communication component 1550, the reception component 1530, and/or the transmission component 1534).

In another configuration, the one or more PRSs may correspond to an individual PRS resource, at least one PRS resource of a PRS resource set, or at least one PRS resource of a PFL.

In another configuration, the range of symbols may be based on a number of PRS symbols configured for the UE and an uncertainty window, where the uncertainty window may be associated with a downlink PRS expected RSTD parameter (nr-DL-PRS-ExpectedRSTD) and a downlink PRS expected RSTD uncertainty parameter (nr-DL-PRS-ExpectedRSTD-Uncertainty).

In another configuration, the at least one DL channel may include one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state. In such a configuration, the apparatus 1502 includes means for selecting the at least some portion of the one or more PRSs or the at least some portion of the at least one DL channel for processing based on a type of the at least one DL channel.

In another configuration, the at least some portion of the one or more PRSs may be selected for processing if the UE is configured to perform a low-latency positioning measurement regardless of whether the range of symbols is within the time threshold of the at least one DL channel.

In another configuration, the at least some portion of the one or more PRSs may be selected for processing if the range of symbols is within the time threshold of the at least one DL channel, and processing for the at least some portion of the at least one DL channel may be skipped. Alternatively, the at least some portion of the at least one DL channel may be selected for processing if the range of symbols is within the time threshold of the at least one DL channel, and processing for the at least some portion of the one or more PRSs may be skipped.

In another configuration, the at least some portion of the one or more PRSs may be selected for processing if the UE has skipped processing previous PRSs for a defined number of times regardless of whether the range of symbols is within the time threshold of the at least one DL channel. Similarly, the at least some portion of the at least one DL channel may be selected for processing if the UE has skipped processing previous DL channels for a defined number of times regardless of whether the range of symbols is within the time threshold of the at least one DL channel.

In another configuration, a value of the time threshold may be based on a frequency range or a bandwidth used for receiving the one or more PRSs or the at least one DL channel. In another configuration, a value of the time threshold is based on a UE capability associated with the UE.

In another configuration, the at least some portion of the one or more PRSs may be selected for processing if at least a portion of the range of symbols is within the time threshold of the at least one DL channel, and the UE may also increase the measurement period. Similarly, the at least some portion of the at least one DL channel may be selected for processing if at least a portion of the range of symbols is within the time threshold of the at least one DL channel, and the UE may also increase the measurement period.

In another configuration, the at least some portion of the one or more PRSs may be selected for processing if a portion of the range of symbols is within the time threshold of the at least one DL channel, where the portion of the range of symbols may correspond to the at least some portion of the one or more PRSs. Similarly, the at least some portion of the at least one DL channel may be selected for processing if a portion of the range of symbols is within the time threshold of the at least some portion of the at least one DL channel.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
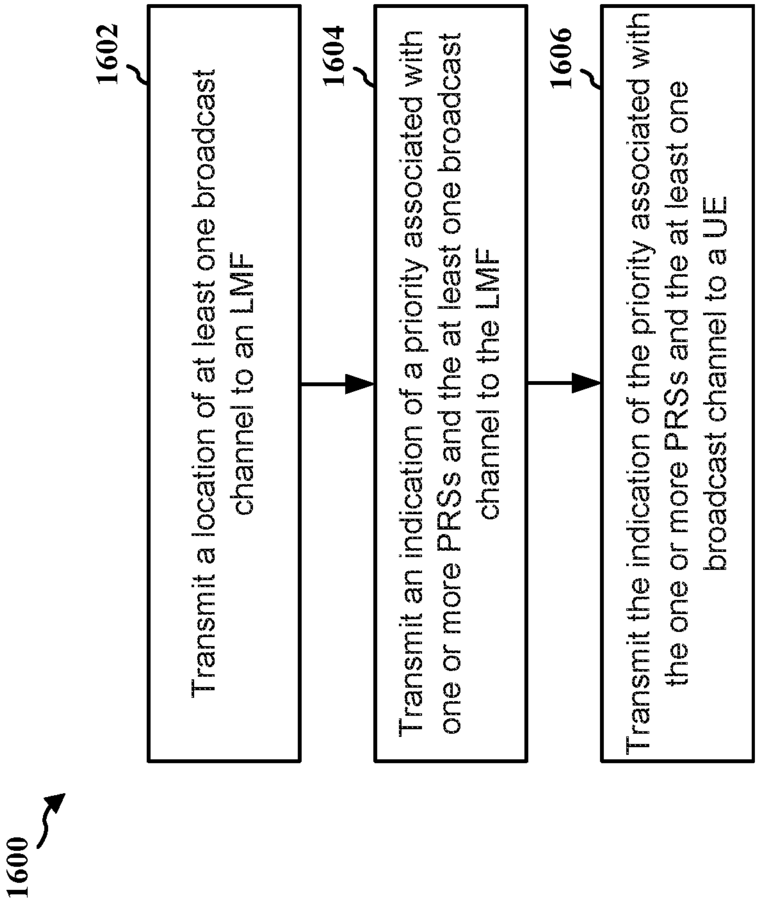
FIG. 16 is a flowchart of a method of wireless communication in accordance with aspects presented herein.

FIG. 16 is a flowchart 1600 of a method of wireless communication. The method may be performed by a network entity or a component of a network entity (e.g., the core network 190; the RAN 1106; the apparatus 1702; a processing system, which may include the memory 376, the TX processor 316 the RX processor 370, and/or the controller/processor 375). The method may enable the network entity to indicate priority associated with PRS and different types of DL channels to a UE and an LMF to assist the UE and the LMF with a positioning session.

At 1602, the network entity may transmit, to an LMF, a location of at least one broadcast channel, such as described in connection with FIG. 11. For example, at 1128, the RAN 1106 may transmit the at least one DL channel 1116's location to the LMF 1108. The transmission of the location may be performed by, e.g., the channel location indication component 1740 and/or the transmission component 1734 of the apparatus 1702 in FIG. 17. In one example, the network entity may be a RAN node.

At 1604, the network entity may transmit, to the LMF, an indication of a priority associated with one or more PRSs and the at least one broadcast channel, such as described in connection with FIG. 11. For example, at 1124, the RAN 1106 may transmit a priority indication 1126 to the LMF 1108 that indicates a priority associated with one or more PRSs 1114 and the at least one DL channel 1116. The transmission of the indication to the LMF may be performed by, e.g., the LMF priority indication component 1742 and/or the transmission component 1734 of the apparatus 1702 in FIG. 17.

In one example, the one or more PRSs may correspond to an individual PRS resource, at least one PRS resource of a PRS resource set, or at least one PRS resource of a PFL.

In another example, the at least one broadcast channel may include one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state.

At 1606, the network entity may transmit, to a UE, the indication of the priority associated with the one or more PRSs and the at least one broadcast channel, such as described in connection with FIG. 11. For example, at 1124, the RAN 1106 may transmit a priority indication 1126 to the UE 1102 that indicates a priority associated with one or more PRSs 1114 and the at least one DL channel 1116. The transmission of the indication to the UE may be performed by, e.g., the UE priority indication component 1744 and/or the transmission component 1734 of the apparatus 1702 in FIG. 17.

Figure 17:
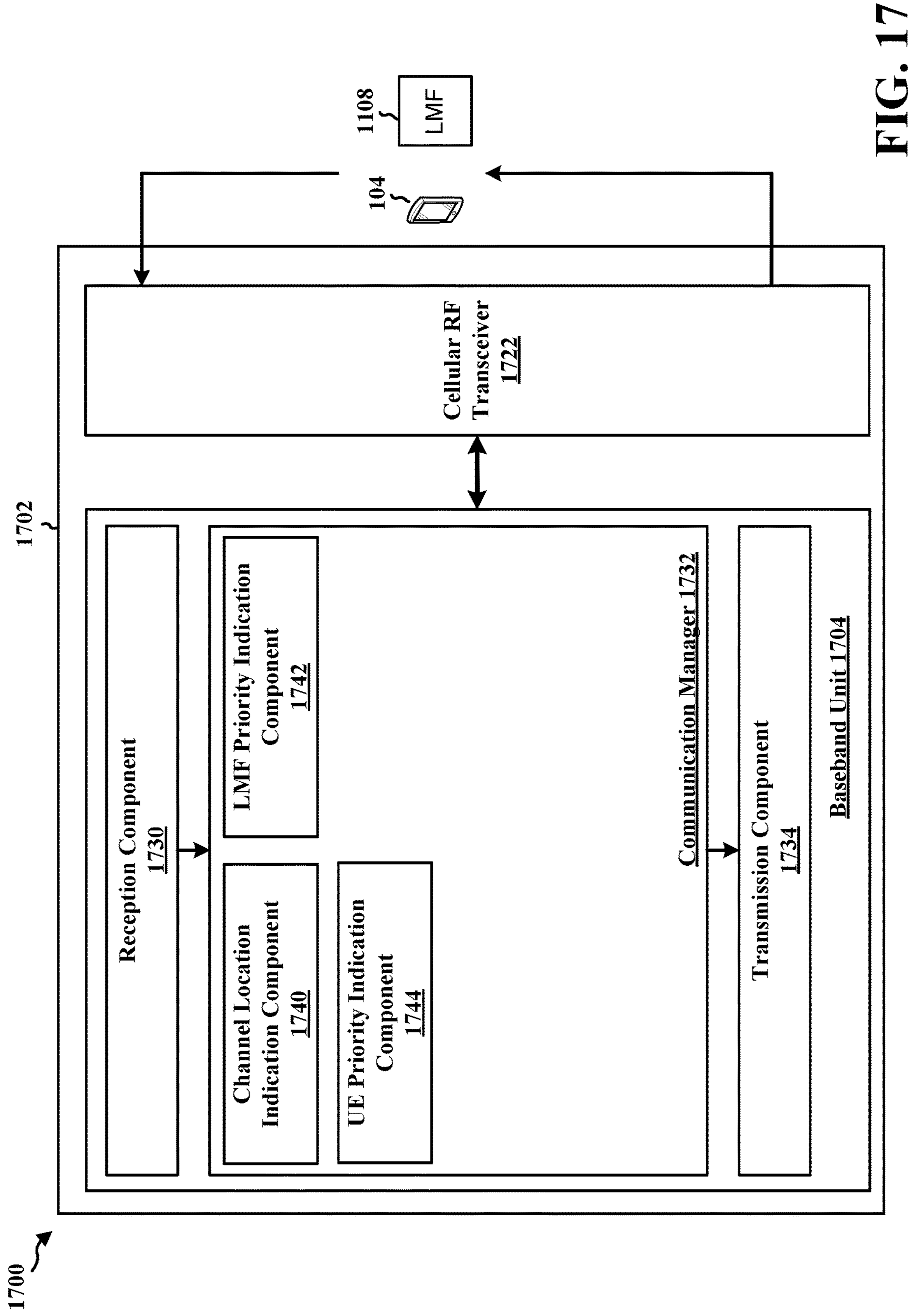
FIG. 17 is a diagram illustrating an example of a hardware implementation for an example apparatus in accordance with aspects presented herein.

FIG. 17 is a diagram 1700 illustrating an example of a hardware implementation for an apparatus 1702. The apparatus 1702 may be a network entity, a component of a network entity, or may implement network entity functionality. In some aspects, the apparatus 1702 may include a baseband unit 1704. The baseband unit 1704 may communicate through a cellular RF transceiver 1722 with the UE 104 and/or the LMF 1108. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the network entity and may include the memory 376 and/or at least one of the TX processor 316, the RX processor 370, and the controller/processor 375.

The communication manager 1732 includes a channel location indication component 1740 that transmit, to an LMF, a location of at least one broadcast channel, e.g., as described in connection with 1602 of FIG. 16. The communication manager 1732 further includes an LMF priority indication component 1742 that transmits, to the LMF, an indication of a priority associated with one or more PRSs and the at least one broadcast channel, e.g., as described in connection with 1604 of FIG. 16. The communication manager 1732 further includes a UE priority indication component 1744 that transmits, to a UE, the indication of the priority associated with the one or more PRSs and the at least one broadcast channel, e.g., as described in connection with 1606 of FIG. 16.

The apparatus may include additional components that perform each of the blocks of the algorithm in the flowchart of FIG. 16. As such, each block in the flowchart of FIG. 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for transmitting, to an LMF, a location of at least one broadcast channel (e.g., the channel location indication component 1740 and/or the transmission component 1734). The apparatus 1602 includes means for transmitting, to the LMF, an indication of a priority associated with one or more PRSs and the at least one broadcast channel (e.g., the LMF priority indication component 1742 and/or the transmission component 1734). The apparatus 1602 includes means for transmitting, to a UE, the indication of the priority associated with the one or more PRSs and the at least one broadcast channel (e.g., the UE priority indication component 1744 and/or the transmission component 1734).

In one configuration, the one or more PRSs may correspond to an individual PRS resource, at least one PRS resource of a PRS resource set, or at least one PRS resource of a PFL.

In another configuration, the at least one broadcast channel may include one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state.

The means may be one or more of the components of the apparatus 1702 configured to perform the functions recited by the means. As described supra, the apparatus 1702 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a wireless device, including: receiving one or more PRSs and at least one DL channel in a measurement period and during an RRC-inactive state or an RRC-idle state, the one or more PRSs occupying a range of symbols that do not overlap with the at least one DL channel in time; selecting at least some portion of the one or more PRSs or at least some portion of the at least one DL channel for processing based on whether the range of symbols is within a time threshold of the at least one DL channel; and processing, based on the selection, the at least some portion of the one or more PRSs or the at least some portion of the at least one DL channel.

Aspect 2 is the method of aspect 1, further including: adjusting a measurement period factor to increase the measurement period based on whether the range of symbols is within the time threshold of the at least one DL channel.

Aspect 3 is the method of any of aspects 1 and 2, where the one or more PRSs correspond to an individual PRS resource, at least one PRS resource of a PRS resource set, or at least one PRS resource of a PFL.

Aspect 4 is the method of any of aspects 1 to 3, where the range of symbols is based on a number of PRS symbols configured for the UE and an uncertainty window.

Aspect 5 is the method of aspect 4, where the uncertainty window is associated with a downlink PRS expected reference signal time difference (RSTD) parameter (nr-DL-PRS-ExpectedRSTD) and a downlink PRS expected RSTD uncertainty parameter (nr-DL-PRS-ExpectedRSTD-Uncertainty).

Aspect 6 is the method of any of aspects 1 to 5, where the at least one DL channel includes one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state.

Aspect 7 is the method of aspect 6, further including: selecting the at least some portion of the one or more PRSs or the at least some portion of the at least one DL channel for processing based on a type of the at least one DL channel.

Aspect 8 is the method of any of aspects 1 to 7, where the at least some portion of the one or more PRSs is selected for processing if the UE is configured to perform a low-latency positioning measurement regardless of whether the range of symbols is within the time threshold of the at least one DL channel.

Aspect 9 is the method of any of aspects 1 to 8, where the at least some portion of the one or more PRSs is selected for processing if the range of symbols is within the time threshold of the at least one DL channel, and processing for the at least some portion of the at least one DL channel is skipped.

Aspect 10 is the method of any of aspects 1 to 9, where the at least some portion of the at least one DL channel is selected for processing if the range of symbols is within the time threshold of the at least one DL channel, and processing for the at least some portion of the one or more PRSs is skipped.

Aspect 11 is the method of any of aspects 1 to 10, where the at least some portion of the one or more PRSs is selected for processing if the UE has skipped processing previous PRSs for a defined number of times regardless of whether the range of symbols is within the time threshold of the at least one DL channel.

Aspect 12 is the method of any of aspects 1 to 11, where the at least some portion of the at least one DL channel is selected for processing if the UE has skipped processing previous DL channels for a defined number of times regardless of whether the range of symbols is within the time threshold of the at least one DL channel.

Aspect 13 is the method of any of aspects 1 to 12, where a value of the time threshold is based on a frequency range or a bandwidth used for receiving the one or more PRSs or the at least one DL channel.

Aspect 14 is the method of any of aspects 1 to 13, where a value of the time threshold is based on a UE capability associated with the UE.

Aspect 15 is the method of any of aspects 1 to 14, where the at least some portion of the one or more PRSs is selected for processing if at least a portion of the range of symbols is within the time threshold of the at least one DL channel, and where the at least one processor is further configured to increase the measurement period.

Aspect 16 is the method of any of aspects 1 to 15, where the at least some portion of the at least one DL channel is selected for processing if at least a portion of the range of symbols is within the time threshold of the at least one DL channel, and where the at least one processor is further configured to increase the measurement period.

Aspect 17 is the method of any of aspects 1 to 16, where the at least some portion of the one or more PRSs is selected for processing if a portion of the range of symbols is within the time threshold of the at least one DL channel, where the portion of the range of symbols corresponds to the at least some portion of the one or more PRSs.

Aspect 18 is the method of any of aspects 1 to 17, where the at least some portion of the at least one DL channel is selected for processing if a portion of the range of symbols is within the time threshold of the at least some portion of the at least one DL channel.

Aspect 19 is the method of any of aspects 1 to 18, where the at least one processor is further configured to: report a location estimate based on the one or more PRSs or communicate via the at least one DL channel.

Aspect 20 is the method of any of aspects 1 to 19, where a bandwidth of the one or more PRSs is different than a bandwidth associated with the at least one DL channel.

Aspect 21 is the method of any of aspects 1 to 20, further including: receiving, from a RAN node, an indication of a priority associated with the one or more PRSs and the at least one DL channel; and selecting the at least some portion of the one or more PRSs or the at least some portion of the at least one DL channel for processing further based on the indication.

Aspect 22 is an apparatus for wireless communication at a wireless device, including: a memory; and at least one processor coupled to the memory and, based at least in part on information stored in the memory, the at least one processor is configured to implement any of aspects 1 to 20.

Aspect 23 is the apparatus of aspect 22, further including at least one of a transceiver or an antenna coupled to the at least one processor.

Aspect 24 is an apparatus for wireless communication including means for implementing any of aspects 1 to 21.

Aspect 25 is a computer-readable medium (e.g., a non-transitory computer-readable medium) storing computer executable code, where the code when executed by a processor causes the processor to implement any of aspects 1 to 21.

Aspect 26 is a method of wireless communication at a network entity, including transmitting, to an LMF, a location of at least one broadcast channel; transmitting, to the LMF, an indication of a priority associated with one or more PRSs and the at least one broadcast channel; and transmitting, to a UE, the indication of the priority associated with the one or more PRSs and the at least one broadcast channel.

Aspect 27 is the method of aspect 26, where the one or more PRSs correspond to an individual PRS resource, at least one PRS resource of a PRS resource set, or at least one PRS resource of a PFL.

Aspect 28 is the method of any of aspects 26 and 27, where the at least one broadcast channel includes one or more of a PSS, an SSS, a PBCH, a PDSCH scrambled with an SI-RNTI, a PDSCH scrambled with a P-RNTI, one or more CORESET monitoring occasions, one or more data channels associated with multicast or broadcast, one or more control channels associated with multicast or broadcast, or one or more reference signals configured for the UE to monitor during the RRC-inactive state or the RRC-idle state.

Aspect 29 is the method of any of aspects 26 to 28, where the network entity is a RAN node.

Aspect 30 is an apparatus for wireless communication at a network entity, including: a memory; and at least one processor coupled to the memory and, based at least in part on information stored in the memory, the at least one processor is configured to implement any of aspects 26 to 29.

Aspect 31 is an apparatus for wireless communication including means for implementing any of aspects 26 to 29.

Aspect 32 is a computer-readable medium (e.g., a non-transitory computer-readable medium) storing computer executable code, where the code when executed by a processor causes the processor to implement any of aspects 26 to 29.

What is claimed is:

1. An apparatus for wireless communication at a user equipment (UE), comprising:
- at least one memory; and
- at least one processor coupled to the at least one memory and configured to:
  - receive one or more positioning reference signals (PRSs) and at least one downlink (DL) channel in a measurement period and during a radio resource control (RRC)-inactive state or an RRC-idle state, the one or more PRSs occupying a range of symbols that do not overlap with the at least one DL channel in time;
  - select at least some portion of the one or more PRSs or at least some portion of the at least one DL channel for processing based on whether the range of symbols is within a time threshold of the at least one DL channel; and
  - process, based on the selection, the at least some portion of the one or more PRSs or the at least some portion of the at least one DL channel.

2. The apparatus of claim 1, wherein the range of symbols is based on a number of PRS symbols configured for the UE and an uncertainty window.

3. The apparatus of claim 2, wherein the uncertainty window is associated with a downlink PRS expected reference signal time difference (RSTD) parameter (nr-DL-PRS-ExpectedRSTD) and a downlink PRS expected RSTD uncertainty parameter (nr-DL-PRS-ExpectedRSTD-Uncertainty).

4. The apparatus of claim 1, wherein the at least one processor is further configured to:
- adjust a measurement period factor to increase the measurement period based on whether the range of symbols is within the time threshold of the at least one DL channel.

5. The apparatus of claim 1, wherein the one or more PRSs correspond to an individual PRS resource, at least one PRS resource of a PRS resource set, or at least one PRS resource of a positioning frequency layer (PFL).

6. The apparatus of claim 1, wherein the at least one DL channel includes one or more of a primary synchronization signal (PSS), a secondary synchronization signal (SSS), a physical broadcast channel (PBCH), a PDSCH scrambled with a system information-radio network temporary identifier (SI-RNTI), a PDSCH scrambled with a paging-radio network temporary identifier (P-RNTI), one or more control resource set (CORESET) monitoring occasions, one or more data channels associated with multicast or broadcast, one or more control channels associated with multicast or broadcast, or one or more reference signals configured for the UE to monitor during the RRC-inactive state or the RRC-idle state.

7. The apparatus of claim 6, wherein the at least one processor is further configured to:
- select the at least some portion of the one or more PRSs or the at least some portion of the at least one DL channel for processing based on a type of the at least one DL channel.

8. The apparatus of claim 1, wherein the at least some portion of the one or more PRSs is selected for processing if the UE is configured to perform a low-latency positioning measurement regardless of whether the range of symbols is within the time threshold of the at least one DL channel.

9. The apparatus of claim 1, wherein the at least some portion of the one or more PRSs is selected for processing if the range of symbols is within the time threshold of the at least one DL channel, and processing for the at least some portion of the at least one DL channel is skipped.

10. The apparatus of claim 1, wherein the at least some portion of the at least one DL channel is selected for processing if the range of symbols is within the time threshold of the at least one DL channel, and processing for the at least some portion of the one or more PRSs is skipped.

11. The apparatus of claim 1, wherein the at least some portion of the one or more PRSs is selected for processing if the UE has skipped processing previous PRSs for a defined number of times regardless of whether the range of symbols is within the time threshold of the at least one DL channel.

12. The apparatus of claim 1, wherein the at least some portion of the at least one DL channel is selected for processing if the UE has skipped processing previous DL channels for a defined number of times regardless of whether the range of symbols is within the time threshold of the at least one DL channel.

13. The apparatus of claim 1, wherein a value of the time threshold is based on a frequency range (FR) or a bandwidth used for receiving the one or more PRSs or the at least one DL channel.

14. The apparatus of claim 1, wherein a value of the time threshold is based on a UE capability associated with the UE.

15. The apparatus of claim 1, wherein the at least some portion of the one or more PRSs is selected for processing if at least a portion of the range of symbols is within the time threshold of the at least one DL channel, and wherein the at least one processor is further configured to increase the measurement period.

16. The apparatus of claim 1, wherein the at least some portion of the at least one DL channel is selected for processing if at least a portion of the range of symbols is within the time threshold of the at least one DL channel, and wherein the at least one processor is further configured to increase the measurement period.

17. The apparatus of claim 1, wherein the at least some portion of the one or more PRSs is selected for processing if a portion of the range of symbols is within the time threshold of the at least one DL channel, wherein the portion of the range of symbols corresponds to the at least some portion of the one or more PRSs.

18. The apparatus of claim 1, wherein the at least some portion of the at least one DL channel is selected for processing if a portion of the range of symbols is within the time threshold of the at least some portion of the at least one DL channel.

19. The apparatus of claim 1, wherein the at least one processor is further configured to:

report a location estimate based on the one or more PRSs or communicate via the at least one DL channel.

20. The apparatus of claim 1, wherein a bandwidth of the one or more PRSs is different than a bandwidth associated with the at least one DL channel.

21. The apparatus of claim 1, wherein the at least one processor is further configured to:

receive an indication of a priority associated with the one or more PRSs and the at least one DL channel from a radio access network (RAN) node; and select the at least some portion of the one or more PRSs or the at least some portion of the at least one DL channel for processing further based on the indication.

22. The apparatus of claim 1, further comprising a transceiver coupled to the at least one processor.

23. A method of wireless communication at a user equipment (UE), comprising:

receiving one or more positioning reference signals (PRSs) and at least one downlink (DL) channel in a measurement period and during a radio resource control (RRC)-inactive state or an RRC-idle state, the one or more PRSs occupying a range of symbols that do not overlap with the at least one DL channel in time;

selecting at least some portion of the one or more PRSs or at least some portion of the at least one DL channel for processing based on whether the range of symbols is within a time threshold of the at least one DL channel; and processing, based on the selection, the at least some portion of the one or more PRSs or the at least some portion of the at least one DL channel.

24. The method of claim 23, wherein the range of symbols is based on a number of PRS symbols configured for the UE and an uncertainty window.

25. The method of claim 24, wherein the uncertainty window is associated with a downlink PRS expected reference signal time difference (RSTD) parameter (nr-DL-PRS-ExpectedRSTD) and a downlink PRS expected RSTD uncertainty parameter (nr-DL-PRS-ExpectedRSTD-Uncertainty).

26. An apparatus for wireless communication at a network entity, comprising:

at least one memory; and at least one processor coupled to the at least one memory and configured to:

transmit a location of at least one broadcast channel to a location management function (LMF);

transmit an indication of a priority associated with one or more positioning reference signals (PRSs) and the at least one broadcast channel to the LMF; and transmit the indication of the priority associated with the one or more PRSs and the at least one broadcast channel to a user equipment (UE).

27. The apparatus of claim 26, wherein the one or more PRSs correspond to an individual PRS resource, at least one PRS resource of a PRS resource set, or at least one PRS resource of a positioning frequency layer (PFL).

28. The apparatus of claim 26, wherein the at least one broadcast channel includes one or more of a primary synchronization signal (PSS), a secondary synchronization signal (SSS), a physical broadcast channel (PBCH), a PDSCH scrambled with a system information-radio network temporary identifier (SI-RNTI), a PDSCH scrambled with a paging-radio network temporary identifier (P-RNTI), one or more control resource set (CORESET) monitoring occasions, one or more data channels associated with multicast or broadcast, one or more control channels associated with multicast or broadcast, or one or more reference signals configured for the UE to monitor during an RRC-inactive state or an RRC-idle state.

29. The apparatus of claim 26, wherein the network entity is a radio access network (RAN) node.

30. A method of wireless communication at a network entity, comprising:

transmitting a location of at least one broadcast channel to a location management function (LMF);

transmitting an indication of a priority associated with one or more positioning reference signals (PRSs) and the at least one broadcast channel to the LMF; and transmitting the indication of the priority associated with the one or more PRSs and the at least one broadcast channel to a user equipment (UE).

* * * * *